US 6,601,958 B2

(12) United States Patent
Ito

(10) Patent No.: US 6,601,958 B2
(45) Date of Patent: Aug. 5, 2003

(54) PROJECTOR

(75) Inventor: Yoshitaka Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 09/769,261

(22) Filed: Jan. 26, 2001

(65) Prior Publication Data
US 2001/0028412 A1 Oct. 11, 2001

(30) Foreign Application Priority Data
Jan. 28, 2000 (JP) ........................... 2000-020815

(51) Int. Cl.⁷ .................................. G03B 21/14
(52) U.S. Cl. .................. 353/38; 353/28; 353/98
(58) Field of Search ................... 353/20, 38, 98, 353/99, 31, 34, 37, 122

(56) References Cited

U.S. PATENT DOCUMENTS

| 5,184,248 A | | 2/1993 | de Vaan et al. | |
| 5,621,486 A | | 4/1997 | Doany et al. | |
| 5,625,738 A | * | 4/1997 | Magarill | 385/146 |
| 5,884,991 A | * | 3/1999 | Levis et al. | 353/122 |
| 6,062,695 A | * | 5/2000 | Kakuda et al. | 353/38 |
| 6,257,726 B1 | * | 7/2001 | Okuyama | 353/20 |
| 6,443,576 B1 | * | 9/2002 | Nishida et al. | 353/98 |
| 6,491,396 B2 | * | 12/2002 | Karasawa et al. | 353/20 |

FOREIGN PATENT DOCUMENTS

| EP | 0 863 427 A1 | 9/1998 |
| EP | 0 883 020 A1 | 12/1998 |
| JP | A 8-34127 | 2/1996 |
| JP | A 9-43562 | 2/1997 |
| JP | A 10-232430 | 9/1998 |
| TW | 174055 | 12/1991 |

* cited by examiner

Primary Examiner—William Dowling
(74) Attorney, Agent, or Firm—Oliff & Berridge, PLC

(57) ABSTRACT

The distance between reflection surfaces of a light guide is set in such a manner as to gradually decrease toward an exit end surface from an incidence end surface. Thus, the equation $$SY/SX < MY/MX$$

is satisfied, where SX designates the arrangement intervals of light source images in the direction along the X-axis, SY denotes the arrangement intervals of the light source images in the direction along the Y-axis, MX designates the length of the incidence end surface of the light guide in the direction along the X-axis, and MY denotes the length of the incidence end surface of the light guide in the direction along the Y-axis. Thus, the polarization separation performance of a polarization beam splitter disposed before the reflection type liquid crystal device can be maintained at a relatively high level. Consequently, a bright projection image having a high contrast ratio can be obtained.

14 Claims, 24 Drawing Sheets

PROJECTOR

BACKGROUND OF THE INVENTION

1. Field of Invention

The present invention relates to a projector.

2. Description of Related Art

In recent years, attention has been focused on a projector (namely, a liquid crystal projector) employing a reflection type liquid crystal device. In such a reflection type liquid crystal device, a structure, such as a transistor, for driving a liquid crystal is incorporated under a reflection mirror. Consequently, the pixel density of the device can be enhanced. Therefore, the reflection type liquid crystal device has an advantage in that a higher-resolution and clearer projection image can be realized, as compared with the case of using a transmission type liquid crystal device.

Further, there has been proposed the use of an integrator optical system or a polarization conversion illumination system in a projector employing an electro-optical device, such as a liquid crystal device, so as to realize a bright projection image, which is free from display unevenness, and to reduce the size of the entire projector (see Japanese Unexamined Patent Application Publication Nos. 8-34127 and 10-232430). In the integrator optical system, a light beam coming from a light source is divided by a light beam dividing optical element into a plurality of light beams to thereby form a plurality of light source images, which are regarded as pseudo light sources. Then, light beams from a plurality of light source images are superposed on a liquid crystal panel. Consequently, light beams having uniform intensity distribution can be obtained. Further, in the polarization conversion illumination system, the illumination light beam is first separated into a plurality of light beams and then undergo the polarization conversion. Then, the light beams are superposed on the liquid crystal device. Consequently, illumination light beams whose polarization directions are uniform can be obtained.

Thus, it is considered that a higher-resolution and brighter projection image, which is free from display unevenness, can be realized by the use of the integrator optical system or the polarization conversion illumination system in combination with the reflection type liquid crystal device that is employed in the projector.

SUMMARY OF THE INVENTION

In the case of using a reflection type liquid crystal device, which utilizes a polarization mode as a display mode, in a projector, generally, a polarization beam splitter for spatially separating light beams, which are respectively in different polarization states, is used. This beam splitter has polarization separation characteristics that largely depend on an incidence angle of a beam. Practically, the polarization separation characteristics of this beam splitter have incidence-angle dependency according to which the polarization separation performance extremely lowers when the incidence angle of light becomes larger in a plane perpendicular to a plane of incidence defined in such a way as to include a substantially center axis of incident light and a normal to the polarization separation film of the beam splitter. Further, in the integrator optical system and the polarization conversion illumination system, optical processes performed therein inevitably result in increase in the incidence angle.

Thus, in the case of using the combination of the integrator optical system and the polarization conversion illumination system in the projector that employs the reflection type liquid crystal device, the incidence angle of light impinging upon the polarization beam splitter is increased. Thus, such a projector has problems in that the polarization separation performance of the polarization beam splitter is degraded, and that the light utilization efficiency thereof is lowered.

The present invention is accomplished in view of at least the aforementioned problems. One object of the present invention is to provide a projector that can at least realize a bright projection image with high light utilization efficiency by using the combination of a reflection type liquid crystal device and an integrator system or a polarization conversion illumination system.

According to an exemplary embodiment of the present invention, there is provided a projector which may include: an illumination device including a light beam dividing optical element for dividing a light beam into a plurality of sub light beams and for forming a plurality of light source images from the plurality of sub light beams; an electro-optical device for modulating an illumination light beams emitted by the illumination device; a projection lens for projecting light beams modulated by the electro-optical device; and a polarization separation film for selecting a light beam of a predetermined polarization component included in the illumination light beam emit the selected light beam of the predetermined polarization component to the electro-optical device, and for selecting a light beam of a predetermined polarization component from the light beams modulated by the electro-optical device to emit the selected light beam of a predetermined polarization component to the projection lens. The light beam dividing optical element is a rod-like light guide having an incidence end surface, an exit end surface, and at least four reflective surfaces. Assuming that an incident plane is a plane defined by a center axis of the illumination light beam and a normal to the polarization separation film, that a direction parallel to the incident plane and perpendicular to the illumination optical axis is the X-direction and a direction perpendicular to the incident plane is the Y-direction, that a length of the incidence end surface in the X-direction is MX and a length of the incidence end surface in the Y-direction is MY, that placement intervals of the plurality of light source images in the X-direction is SX and placement intervals of the plurality of light source images in the Y-direction is SY, then the lengths MX and MY and the intervals SX and SY meet the following condition:

$$SY/SX < MY/MX.$$

The polarization separation performance of a practical polarization separation film has large dependency on the incidence angle of each incident light beam. Especially, when the incidence angle of each of the light beams increases in the Y-direction that is perpendicular to the incident surface, the polarization separation performance is extremely degraded. However, the projector of this exemplary embodiment of the present invention satisfies the condition $$SY/SX < MY/MX.$$

Thus, a range of incidence angles in Y-direction of a light beam impinging on the incident surface can be narrowed. Consequently, the polarization separation performance of the polarization separation film can be enhanced. Thus, a bright projection image having a high contrast ratio can be realized.

Further, in the case that a color separation optical system for separating an illumination light beam from the illumination device into a plurality of color light beams is added to the constituent elements of this projector, and that a plurality of the electro-optical devices for modulating the color light beams separated by the color separation optical system are provided in this projector, a high-resolution color display can be realized.

Preferably, in the projector of this exemplary embodiment, the distance between a pair of the reflection surfaces opposed to each other in the Y-direction of the light guide gradually increases toward the exit end surface from the incidence end surface. With such a configuration, the placement interval in the Y-direction of a plurality of the light source can easily be decreased. Thus, a range of the incidence angle in Y-direction of a light beam impinging on the polarization separation surface can be narrowed. Moreover, the polarization separation performance of the polarization separation film can be enhanced. Furthermore, a space, in which a plurality of images of the light source are formed, can be reduced. Consequently, the area of the polarization separation film can be reduced. Reduction in the size and weight of the entire illumination device can be achieved.

Further, the projector may be adapted so that the distance between a pair of the reflection surfaces opposed to each other in the X-direction of the light guide gradually decreases toward the exit end surface from the incidence end surface. In this case, the state in which the light source images are formed can be more freely controlled. Thus, the light utilization efficiency of the entire optical system can be enhanced.

Moreover, preferably, in the projector of this exemplary embodiment, the shape of the exit end surface of the light guide is similar to the shape of a display area of the electro-optical device. Consequently, the illumination efficiency can be improved.

Incidentally, in the projector of this exemplary embodiment, it is sufficient that the rod-like light guide has at least two pairs of reflective surfaces opposed to each other in first and second directions, and that thus, the shape of a section of each of the light guide is a quadrangle or a polygon having more than four sides and more than four angles. For example, the shape of a section of the light guide may be an octagon or a dodecagon. However, it is preferable in view of the light utilization efficiency of the projector that the light beam dividing element has a square incidence end surface. Further, as long as an incident light beam is reflected by the reflective surface and then divided into a plurality of light beams whose exit angles with respect to the exit end surface differ from one another according to the reflecting positions and the number of times of reflections, the rod-like light guide may be formed as a lump of a light guiding material or may be shaped like a cylinder. In the case that the light beam dividing optical element is a solid rod made of a rod-like lump of a light guiding material, the surface of the light guiding member placed along the illumination optical axis is a total reflective surface. Thus, the incident light is reflected by the surface of the solid rod while the incident light is transmitted in the light guiding material from the incidence end surface to the exit end surface. On the other hand, in the case that the light beam dividing optical element is a hollow rod formed by shaping a member having a light reflective surface into a cylinder, incident light is reflected by the light reflective surface (desirably, a surface reflection face) placed along the illumination optical axis of the hollow rod while the incident light is transmitted in an air layer formed in the hollow rod from the incidence end surface to the exit end surface. The former light beam dividing optical element formed as a lump of a light guiding material can transmit the light beam by total reflection that causes almost no light loss. Thus, the transmission efficiency is high. Conversely, in the case of using the latter cylindrical light beam dividing optical element that has the reflection surface, a uniform illumination light beam even when the dimension of a portion between the incidence end surface and the exit end surface is set at a relative small value. Moreover, the manufacturing of the latter light beam dividing optical element can be performed more easily than that of the former light beam dividing optical element. The manufacturing cost of the illumination device having the latter light beam dividing optical element can be made to be lower than that of the illumination device having the former light beam dividing optical element.

According to another exemplary embodiment of the present invention, there is provided a projector which may include: an illumination device including a light beam dividing optical element for dividing a light beam into a plurality of sub light beams and for forming a plurality of light source images from the plurality of partial bundles of light beams; an electro-optical device for modulating an illumination light beam emitted by the illumination device, a projection lens for projecting light beams modulated by the electro-optical device device; and a polarization separation film for selecting a light beam of a predetermined polarization component included in the illumination light beam to emit the selected light beam of the predetermined polarization component to the electro-optical device, and for selecting a light beam of a predetermined polarization component from the light beams modulated by the electro-optical device to emit the selected light beam to the projection lens. The light beam dividing optical element is a lens array having a plurality of small lenses. Assuming that an incident plane is a plane defined by the center axis of the illumination light beam and a normal to the polarization separation film, that a direction parallel to the incident plane and perpendicular to the illumination optical axis is the X-direction and a direction perpendicular to the incident plane is the Y-direction, that a length of a contour of said small lens in the X-direction is MX and a length of the contour of the small lens in the Y-direction is MY, and that placement intervals of the light source images in the X direction is SX and placement intervals of the light source images in the Y direction is SY, then the lengths MX and MY and the intervals SX and SY meet the following condition:

$$SY/SX < MY/MX.$$

Thus, even in the case of employing a lens array as the light beam dividing optical element, a range of the incidence angle in the Y-direction of a light beam impinging on the polarization separation film can be reduced, similarly as in the case of the projector of the previous exemplary embodiment. Consequently, the light utilization efficiency of the entire projector can be improved while the polarization separation performance of the polarization separation film is enhanced. Incidentally, the small lenses which form the lens array may be ordinary lenses, whose surfaces are formed as curved surfaces. Alternatively, a hologram lens which condenses light by holographic effects, or a diffractive lens which condenses light by diffraction may be employed as the small lens.

Further, in the case that a color separation optical system for separating an illumination light beam emitted by the illumination device into a plurality of color light beams is added to the constituent elements of this projector, and that a plurality of the electro-optical devices for modulating the color light beams separated by the color separation optical system are provided in this projector, a high-resolution color display can be realized.

Preferably, in the projector of this exemplary embodiment, the contour of the plurality of small lenses is similar to the shape of the display area of the electro-optical device. The images formed on the small lenses are superposed on the electro-optical device serving as an illumination area. Thus, the illumination efficiency can be enhanced by making the shape of the lens similar to the shape of the electro-optical device.

Moreover, in the projector of this exemplary embodiment, it is preferable that at least a part of a plurality of small lenses are decentered lenses. With such a configuration, an image of the light source can be formed at a position that is other than the physical center of each of the small lenses, which allows intervals at which light source images are formed to be controlled freely.

Furthermore, in the second projector, preferably, the illumination device has a reduction optical system for reducing a diameter of a light beam. With such a configuration, the diameter in Y-direction of an illumination light beam can be still further reduced. Thus, the polarization separation performance of the polarization separation film can be still further improved. Additionally, the necessity for setting the condensing characteristics of the plurality of small lenses is eliminated. Furthermore, the diameter of the entire light beam which illuminates the illumination area can be reduced. Thus, after modulated by the electro-optical devices (for instance, liquid crystal devices), the diameter of the entire light beam reaching the projection optical system can be reduced. Consequently, the projector of this exemplary embodiment has an advantage in that the light utilization efficiency of the projection optical system can be improved.

Needless to say, the projector may be configured so that the diameter in the X-direction of the illumination light beam is simultaneously reduced by the reduction optical system. Such a configuration is easy to employ in the case of using a light source that is close to a point light source.

Incidentally, such a reduction optical system can easily be realized by an afocal optical system. Further, in this reduction optical system, a cylindrical lens can be used as the lens of the afocal optical system in the case that only the dimension in the Y-direction is reduced.

According to another exemplary embodiment of the present invention, there is provided a third projector which may include: an illumination device for dividing a light beam into a plurality of sub light beams and for forming a plurality of light source images from the plurality of sub light beams; an electro-optical device for modulating an illumination light beam emitted by the illumination device; a projection lens for projecting a light beam modulated by the electro-optical device; and a polarization separation film for selecting a light beam of a predetermined polarization component included in the illumination light beam to emit the selected light beam of the predetermined polarization component to the electro-optical device, and for selecting a light beam of a predetermined polarization component from the light beams modulated by the electro-optical device to emit the selected light beam to said projection lens. The illumination device has a reduction optical system for reducing a diameter of a light beam. Assuming that an incident plane is a plane defined by the center axis of the illumination light beam and a normal to the polarization separation film, and that a direction parallel to the incident plane and perpendicular to the illumination optical axis is the X-direction and the direction perpendicular to the incident plane is the Y-direction, then a rate of reduction in the diameter of the light beam in the Y-direction by the reduction optical system is larger than a rate of reduction in the diameter thereof in the X-direction.

Thus, even in the case of the configuration in which the reduction optical system for reducing the diameter of the light beam is provided between the illumination device and the polarization separation film to thereby make the rate of reduction in the diameter of the light beam in the Y-direction of the bundle of light beams larger than the rate of reduction in the diameter thereof in the X-direction, the range of the incidence angle of the light beam impinging on the polarization separation film can be reduced in the Y-direction, similarly as in the case of the projector of the first exemplary embodiment. Consequently, the light utilization efficiency of the entire projector can be improved while the polarization separation performance of the polarization separation film is enhanced. Further, in this case, the range of the incidence angles of the light beam impinging upon the polarization separation film can be reduced in the Y-direction without designing the illumination device so that $$SY/SX < MY/MX$$

holds, similarly as in the case of the projectors or the previous exemplary embodiments. Thus, the configuration of the illumination device can be simplified. Incidentally, a rod-like light guide may be used as the light beam dividing element, similarly as in the case of the projector of the first exemplary embodiment. Alternatively, a lens array may be used as the light beam dividing element, similarly as in the case of the projector of the second exemplary embodiment.

Further, in the case that a color separation optical system for separating an illumination light beam emitted by the illumination device into a plurality of color light beams is added to the constituent elements of the projector of this exemplary embodiment, and that a plurality of the electro-optical devices for modulating the color light beams separated by the color separation optical system and a projection lens for projecting light modulated by the plurality of electro-optical devices are provided in this projector, a high-resolution color display can be realized.

DETAILED DESCRIPTION OF PREFERRED EMBODIMENTS

In the following description, it is assumed that the direction of Z-axis is a direction in which light travels, and that, when viewed in the direction in which light travels, the direction of Y-axis is the 12 o'clock direction, and the direction of X-axis is the 3 o'clock direction.

Figure 1:
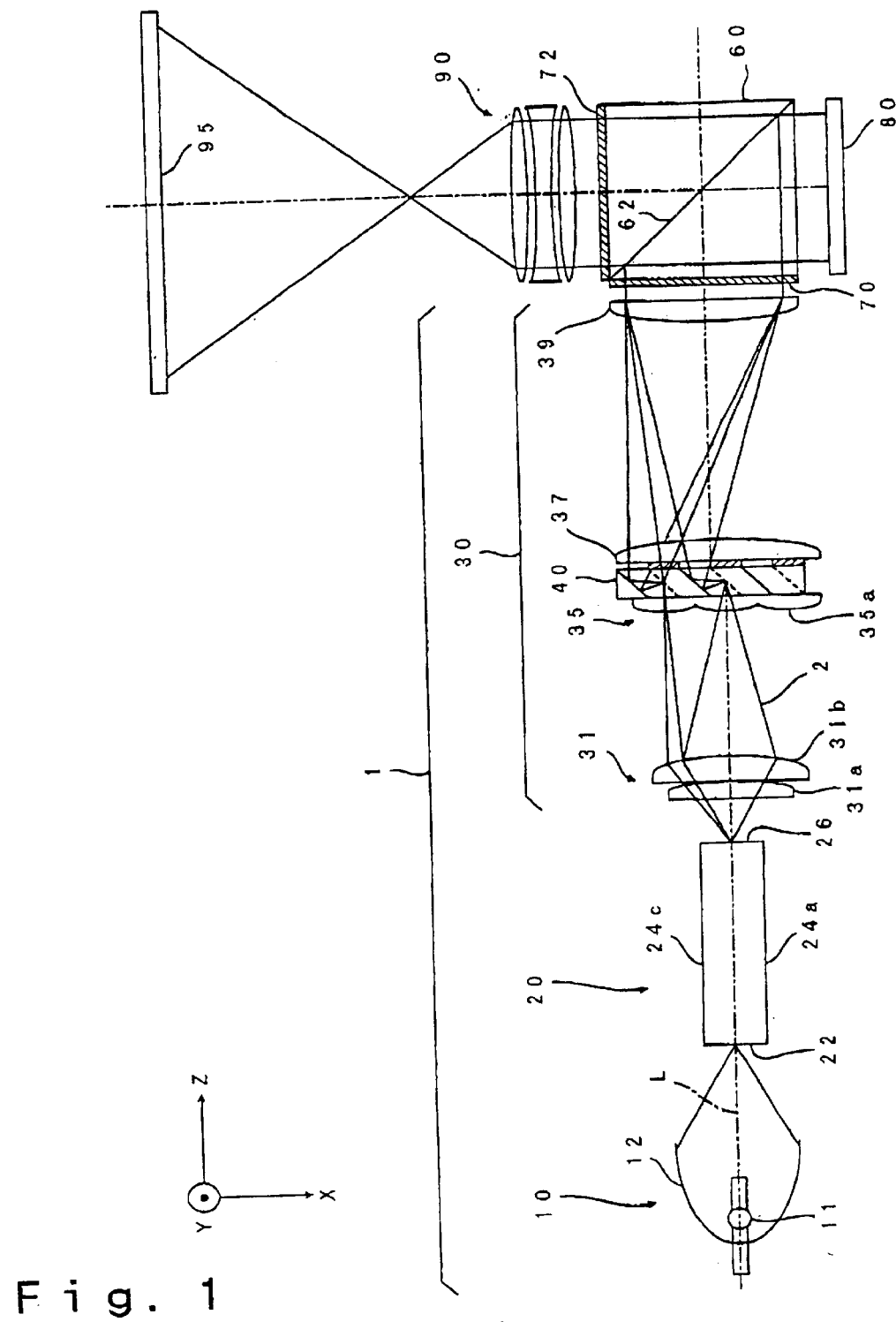
FIG. 1 is a schematic plan view illustrating a first exemplary embodiment of the projector of the present invention.

FIG. 1 is a schematic plan view illustrating a first exemplary embodiment of a projector of the present invention.

The projector according to this embodiment may substantially include an illumination device 1, a polarization beam splitter 60, polarizing plates 70 and 72, a reflection type liquid crystal device 80 serving as an electro-optic device, and a projection lens 90 for projecting an image onto a projection surface 95, such as a screen.

The illumination device 1 has a light source 10, a columnar light guide 20 serving as a light beam dividing element for dividing a light beam outputted from the light source 10 into a plurality of sub light beams, a relay optical system 30 for transmitting an image formed on an exit end surface 26 of the light guide 20 to the liquid crystal device 80, and a polarization conversion element 40 placed in the relay optical system 30 for performing polarization separation and polarization conversion. These elements are disposed along an imaginary illumination optical axis L that is in parallel with Z-axis. The illumination device 1 divides a light beam emitted from the light source 10 into a plurality of sub light beams 2 and then converts each of the light beams 2 into a single kind of polarized light by means of the polarization conversion element 40, and thereafter superposes polarized light on an illumination area in the liquid crystal device 80.

The light source 10 has a light emitting tube 11 for radiating light, and an elliptic reflector 12 for collecting the light radiated from the light emitting tube 11. One of two focal points is set in such a manner as to be positioned in the vicinity of the center of a discharge arc formed in the light emitting tube 11. Further, the other focal point is set in such a way as to be positioned in the proximity of an incidence end surface 22 of the light guide 20. Light radiated from the light emitting tube 11 is collected by the elliptic reflector 12 to the vicinity of the incidence end surface 22 of the light guide 20 and incident upon the light guide 20. A parabolic reflector or a spherical reflector may be used instead of the elliptic reflector 12. Incidentally, in such a case, it is necessary to converge nearly parallel light beams, which are outputted from the reflector, to the incidence end surface 22 of the light guide 20 by using a condensing lens.

Figure 2A:
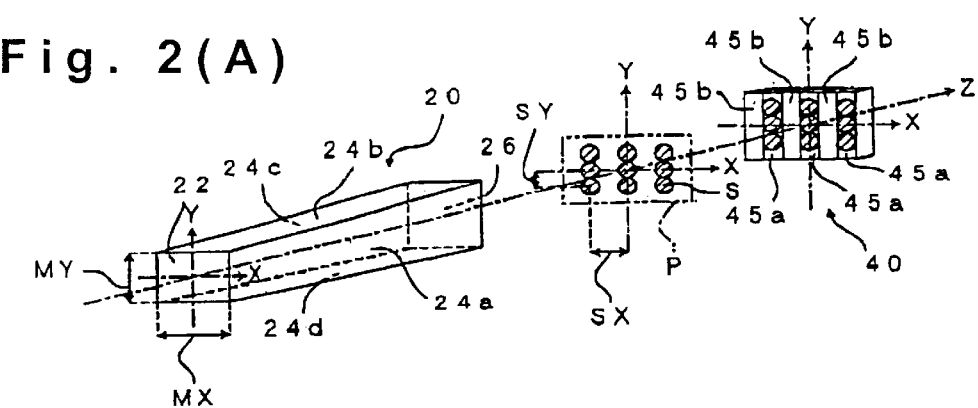
FIG. 2(a) is a diagram illustrating the relation between the shape of a light guide of the first embodiment and the placement intervals of light source images thereof.

As illustrated in FIGS. 1 and 2(a), the light guide 20 is a columnar solid rod formed by using a light transmissive light guiding material such as optical glass, and has the incidence end surface 22 on which light beams are incident, at least four reflective surfaces 24a, 24b, 24c, and 24d for reflecting and transmitting light beams, and an exit end surface 26 from which the transmitted light beams are outputted. Each of the incidence end surface 22 and the exit end surface 26 has a rectangular section in the X-Y plane. The shape of the exit end surface 26 is similar to that of the illumination area of the liquid crystal device 80.

A light beam having impinged upon the light guide 20 is divided into a plurality of sub light beams which are different from one another in an exit angle according to the differences among the reflection surfaces 24a, 24b, 24c, and 24d in the reflecting position thereon and the number of reflections caused thereon. The plurality of sub light beams 2 outputted from the light guide 20 at different angles are condensed by a condenser optical system 31 to thereby form a plurality of light source images S at positions which are apart from one another at a predetermined distance in the X-Y plane (hereunder referred to an "imaginary plane P") which is substantially perpendicular to the illumination optical axis L.

In this embodiment, as illustrated in FIG. 2(a), the distance between a pair of reflection surfaces 24b and 24d opposed to each other in the direction of Y-axis, among at least the four reflection surfaces 24a, 24b, 24c, and 24d, gradually increases toward the exit end surface 26 from the incidence end surface 22. A pair of reflection surfaces 24a and 24c opposed to each other in the direction of X-axis are parallel to each other.

Figure 2B:
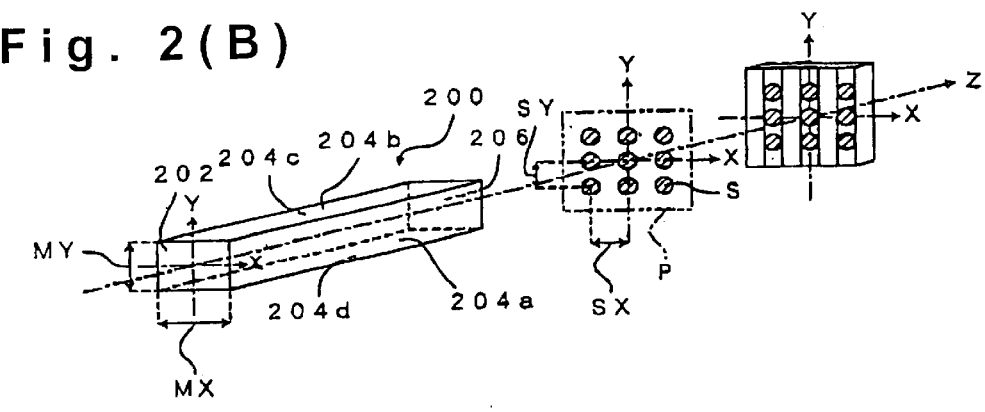
FIG. 2(b) is a diagram illustrating the relation between the shape of a light guide of a comparative example and the placement intervals of light source images thereof.

Next, the relation between the shape of the light guide 20 and the placement intervals of light source images S are described hereinbelow with reference to FIGS. 2(a) and 2(b). FIG. 2(b) illustrates a comparative example of replacing the light guide 20 with a light guide 200 in which the reflective surfaces 204a and 204b are parallel to each other and in which the reflective surfaces 204b and 204d are parallel to each other. In FIGS. 2(a) and 2(b), "MX" designates the length in the direction of X-axis of each of the incidence end surfaces 22 and 202 of the light guide 20 and 200. Further, "MY" denotes the length in the direction of Y-axis of each of the incidence end surfaces 22 and 202 of the light guide 20 and 200. Moreover, "SX" designates the placement interval in the direction of X-axis of the images S of the light source. Furthermore, "SY" designates the placement interval in the direction of Y-axis of the images S of the light source. In the case of the comparative example of FIG. 2(b), the relation thereamong is given by:

$$SY/SX=MY/MX.$$

Incidentally, the placement interval of the images S of the light source, which are formed in the imaginary plane P, can be arbitrarily controlled by adjusting the distances among the reflective surfaces of the light guide. The placement intervals of the light source images S can be increased by gradually decreasing the distance between the reflective surfaces toward the exit end surface from the incidence end surface. Conversely, when the distance between the reflective surfaces is gradually increased toward the exit end surface from the incidence end surface, the placement intervals of the light source images S can be decreased. In the case of this embodiment illustrated in FIG. 2(a), the distance between the reflective surfaces 24b and 24d gradually increases toward the exit end surface 26 from the incidence end surface 22. Thus, as compared with the case illustrated in FIG. 2(b), the placement intervals SY are smaller in the direction of Y-axis. Therefore, in the case of this embodiment, the relation thereamong is given by:

$$SY/SX<MY/MX.$$

The reason for forming the light guide 20 in such a shape will be described later.

Incidentally, two kinds of rods may be used as the light guide 20. That is, one is a columnar solid rod made of a light transmissive light guiding material, such as optical glass. The other is a hollow rod whose light reflection surface is shaped in a column. The solid rod used in this embodiment may be replaced with such a hollow rod. Further, a reflective mirror made of a metallic material, or another reflective mirror having a highly-enhanced-reflectance reflection film is formed on the surface thereof from a dielectric multilayer film may be used as the reflection mirror. The hollow rod can be more easily manufactured than the solid rod. Thus, as compared with the case of using the solid rod, the cost of the illumination device 1 can be reduced in the case of using the hollow rod. Moreover, since the hollow rod contains air whose refractive index is nearly 1, the dimension in the direction of Z-axis of the light guide 20 can be decreased, in comparison with the case of using a solid rod whose refractive index is greater than 1. Consequently, the size of the illumination device 1 can be reduced.

The polarization conversion element 40 has a function of converting a light beam (hereunder referred to a "non-polarized light beam"), whose polarization direction is random, into a single kind of a linearly polarized light beam. Although the polarization conversion element 40 is placed in the vicinity of the positions at which a plurality of light source images are formed, in FIGS. 2(a) and 2(b) the positions where the light source images S are formed and where the polarization conversion element 40 is placed are shifted, for convenience of drawing.

Figure 3A:
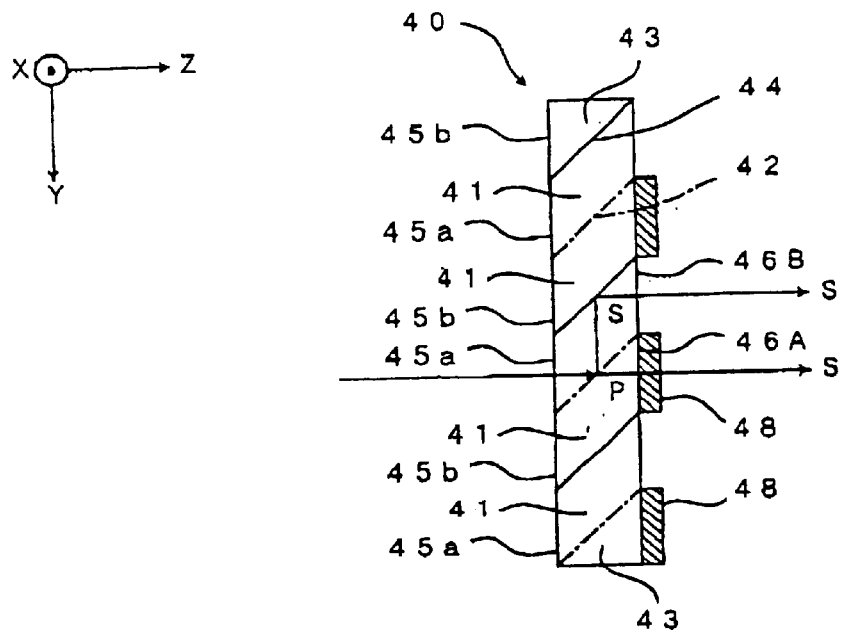
FIG. 3(a) is a schematic plan view illustrating the configuration of a polarization conversion optical system.
Figure 3B:
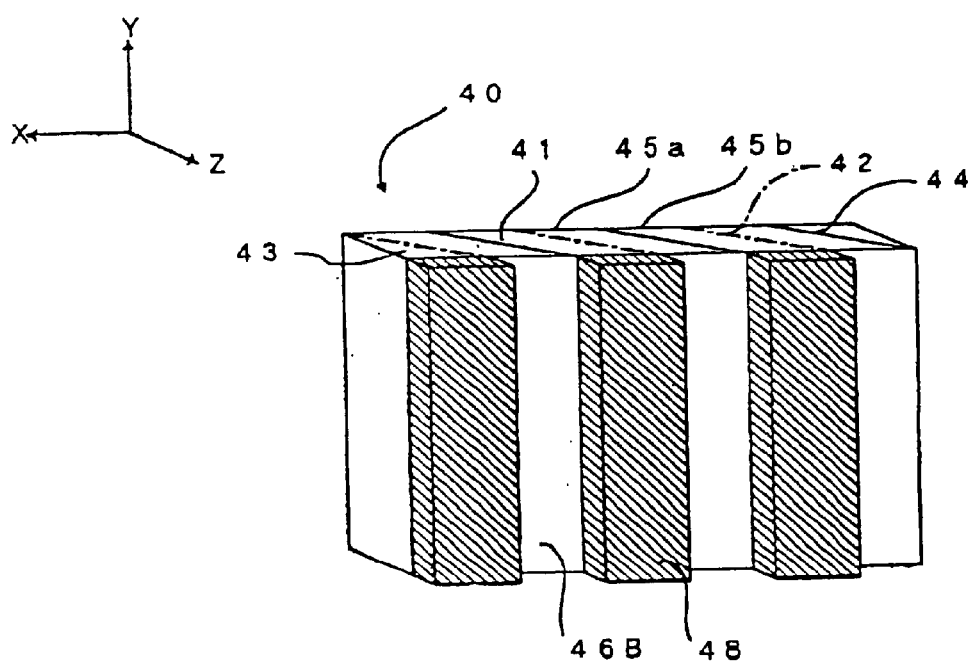
FIG. 3(b) is a perspective view illustrating the outward appearance of the polarization conversion optical system.

FIG. 3(a) is a plan view illustrating the configuration of the polarization conversion element 40. FIG. 3(b) is a perspective view of the outward appearance thereof. The polarization conversion element 40 is substantially composed of a plurality of pillar-like transmissive members 41, each having a parallelogram section, two pillar-like transmissive members 43, each having a triangular section, a plurality of polarization separation films 42 and reflection films 44 alternately provided in the boundary surfaces between the transmissive members 41 and 43, and retardation films 48 provided at constant intervals on the exit sides of the transmissive members 41 or 43. The polarization separation films 42 and the reflection films 44 are disposed in such a way as to be substantially parallel to each other. Incidentally, for convenience of description, in the incidence-side surface of the polarization conversion element 40, the surface directly corresponding to the polarization conversion film 42 is designated as an "incident surface 45a", while the surface directly corresponding to the reflection surface 44 is designated as an "incident surface 45b". Similarly, in the exit-side surface of the polarization conversion element 40, the surface directly corresponding to the polarization conversion film 42, is designated as an "exit surface 46A", while the surface directly corresponding to the reflection surface 44 is designated as an "exit surface 46B".

The polarization separation film 42 separates a non-polarized light beam into two kinds of linearly polarized light beams. In this embodiment, a non-polarized light beam having impinged upon the polarization separation film 42 is split into a p-polarized light beam that passes through the polarization separation film 42, and an s-polarized light beams that is reflected by the polarization separation film 42 so that the travelling direction thereof is turned by nearly 90 degrees. In this embodiment, the polarization separation film 42 is formed to have a certain angle and has properties so that light is reflected thereon in a direction nearly parallel to the direction of X-axis. This polarization separation film 42 may be formed from a dielectric multilayer film. Incidentally, the polarization separation film 42 may have such properties as to transmit an s-polarized light beam and to reflect a p-polarized light beam.

The reflection film 44 reflects the s-polarized light beam reflected by the polarization separation film 42 so that the travelling direction of the reflected light beam is substantially the same as the travelling direction of the p-polarized light beam. This reflection film 44 may be formed from a dielectric multilayer film or an aluminum film.

The retardation film 48 is selectively disposed only on the exit surface 46A from which the p-polarized light beam is transmitted by the polarization separation film 42. In this embodiment, a $\lambda/2$ phase plate is used as the retardation film 48. When a p-polarized light beam passes through the retardation film 48, the polarization direction thereof is turned by substantially 90 degrees, so that the p-polarized light beam is converted into an s-polarized light beam. On the other hand, second polarized light reflected by the reflective film 44 is outputted from the exit surface 46B without undergoing the action of the retardation film 48. Consequently, most of light beams outputted from the polarization conversion element 40 are s-polarized light beams. Incidentally, as long as the polarization directions of the two kinds of the polarized light beams can be unified into that of a single kind of polarized light beam, the kind and position of the retardation film is not limited. For instance, a combination of two λ/4 phase plates each for turning the polarization direction of the incident light beam by 45 degrees may be used, instead of the λ/2 phase plate 48. Alternatively, two kinds of retardation films which provide different phase differences may be disposed on the exit surfaces 46A and 46B, respectively, so that the polarization directions of polarized light beams passing through these retardation films are made to be uniform. Further, alternatively, the λ/2 phase plate 48 may be disposed only on the exit surface 46a, so that the light beams outputted from the polarization conversion element 40 are p-polarized light beams.

The relay optical system 30 is an optical system for transmitting an image, which is formed on the exit end surface 26 of the columnar light guide 20, to the liquid crystal device 80, as illustrated in FIG. 1. In this embodiment, the relay optical system 30 includes the condenser optical system 31, a first transmitter lens 35, a second transmitter lens 37, and a collimating lens 39.

The condenser optical system 31 is disposed in the neighborhood of the exit end surface 26 of the light guide 20 and has a function of introducing sub light beams coming from the light guide 20 to the first transmitter lens 35. Although the condenser optical system 31 of this embodiment is constituted by a complex lens which is a combination of two collection lenses 31a and 31b, the condenser optical system 31 is not limited thereto. A single lens may be used as the system 31. Incidentally, the use of the complex lens or an aspheric lens is suitable for reducing optical aberration, which is liable to occur when the sub light beams 2 are introduced to the first transmitter lens 35.

The first transmitter lens 35 is a lens array obtained by combining a plurality of rectangular small lenses 35a to substantially form a matrix, and has a function of efficiently introducing a plurality of sub light beams into the incident surface 45a of the polarization conversion element 40. The number and placement of the small lenses 35a are determined in such a way as to respectively correspond to the number of images of the light source and the position at which these images are formed. The shape of each of small lenses 35a of the first transmitter lens 35 is not limited. However, a plurality of rectangular small lenses 35, which are arranged in a planar manner and formed as a plate-like unit, similarly as in the case of this embodiment, are easy to utilize. Further, when the first transmitter lens 35 is constituted by a plurality of small lenses 35a, the condensing characteristics of each of small lenses can be optimized. Thus, optical aberration, which is liable to occur when transmitting a light beam, can be effectively reduced. Incidentally, when the light beam outputted from the light guide 20 has some characteristics (for instance, when a radiation angle is small), the first transmitter lens 35 may be constituted by a single lens without using the small lenses. Additionally, in some cases, the first transmitter lens 35 may be omitted.

The second transmitter lens 37 is disposed at the exit side of the polarization conversion element 40 and has a function of transmitting a plurality of sub light beams, which are outputted from the polarization conversion element 40, to the liquid crystal device 80 and superposing the sub light beams on a single illumination area. Although the second transmitter lens 37 of this embodiment is a condenser lens constituted by a single lens, this transmitter lens 37 may be a lens array consisting of a plurality of small lenses, similarly as the first transmitter lens 35.

Incidentally, although the first transmitter lens 35 is disposed at the incidence side of the polarization conversion element 40 and the second transmitter lens 37 are placed at the exit side of the polarization conversion element 40 in this embodiment, both the two transmitter lenses 35 and 37 may be disposed at the incidence or exit side of the polarization conversion element 40. In this case, a single lens having the functions of the two transmitter lenses 35 and 37 may be provided instead of employing these two transmitter lenses. Further, in this case, the cost of the illumination device can be reduced. Moreover, the first transmitter lens 35 is placed at the incidence side of the polarization conversion element 40 in this embodiment. Thus, the first transmitter lens 35 is made to have the function of efficiently introducing a plurality of sub light beams to the incident surface 45a of the polarization conversion element 40. Further, the second transmitter lens 37 is placed at the exit side of the polarization conversion element 40. Thus, this transmitter lens is made to have the function of superposing a plurality of sub light beams on the liquid crystal device 80. However, the functions to be imparted to the transmitter lenses 35 and 37 may be suitably changed according to the positions of the lenses 35 and 37.

The collimating lens 39 is disposed at the incidence side of the liquid crystal device 80, and has the function of turning each of the light beams which are incident upon the liquid crystal device 80 into a light beam parallel to the center axis thereof, and efficiently introducing the parallel light beams into the liquid crystal device 80.

Because this embodiment has such a relay optical system 30, an image formed on the exit end surface 26 of the light guide 20 is transmitted to the reflection type liquid crystal device 80 after being enlarged or reduced.

1-2. Polarization Beam Splitter, Liquid Crystal Device, Projection Lens

The polarization beam splitter 60 is formed by sandwiching a polarization separation film 62 between two right-angle prisms and then joining the right-angle prisms. Further, the polarization beam splitter 60 is an optical element having the function of splitting a non-polarized light beam into two kinds of linearly polarized light beams whose polarization directions are perpendicular to each other. The polarization separation film 62 is formed from a dielectric multilayer film, similarly as in the case of the polarization separation film 42.

An s-polarized light beam emitted from the illumination device 1 is incident upon the polarization beam splitter 60 and then reflected by the polarization separation film 62. Subsequently, the reflected light beam is emitted to the reflection type liquid crystal device 80. Then, the liquid crystal device 80 modulates light in response to an image signal inputted from an external device (not shown) and changes the polarization state thereof. Incidentally, the reflection type liquid crystal device 80 is a known device, so that the detail description of the configuration and operation thereof is omitted herein.

The light modulated by the liquid crystal device 80 is incident on the polarization beam splitter 60. At that time, the light modulated by the liquid crystal device 80 is partly converted according to an image signal and put into a P-polarization state. A light beam put into the p-polarized state is transmitted by the polarization separation film 62 and then emitted to the projection lens 90. Subsequently, the light emitted to the projection lens 90 is projected onto the projection surface 95, such as a screen.

The polarizing plates 70 and 72 respectively disposed at the incidence side and the exit side of the polarization beam splitter 60 have the function of enhancing the degree of polarization of the polarized light beam passing through the polarizing plates. In the case that the degree of polarization of the polarized light beam emitted from the illumination device 1 is sufficiently high, the polarizing plate 70 can be omitted. Similarly, in the case that the degree of polarization of the polarized light beam outputted from the polarization beam splitter 60 to the projection lens 90 is sufficiently high, the polarizing plate 72 can be omitted.

In this embodiment, the liquid crystal device 80 is disposed at a position at which the liquid crystal device 80 and the projection lens 90 face each other across the polarization beam splitter 60. However, the liquid crystal device 80 may be disposed at a position at which the liquid crystal device 80 and the illumination device 1 face each other across the polarization beam splitter 60. In this case, it is sufficient to configure the projector by preliminarily setting each of the polarization states of the illumination light beams, which are emitted from the liquid crystal device 80, to be the p-polarized state, and by being adapted so that the s-polarized light beam is incident on a projection optical system. Alternatively, the projector is adapted to have such characteristics that the polarization separation film 62 of the polarization separation beam splitter 60 reflects the p-polarized light beams and transmits the s-polarized light beams.

Finally, the effects of decreasing the placement intervals of the light source images SY in the direction of Y-axis in this embodiment, that is, the reasons for shaping the light guide 20 in such a way as to meet the condition $$SY/SX < MY/MX$$

are described hereinbelow.

Figure 4:
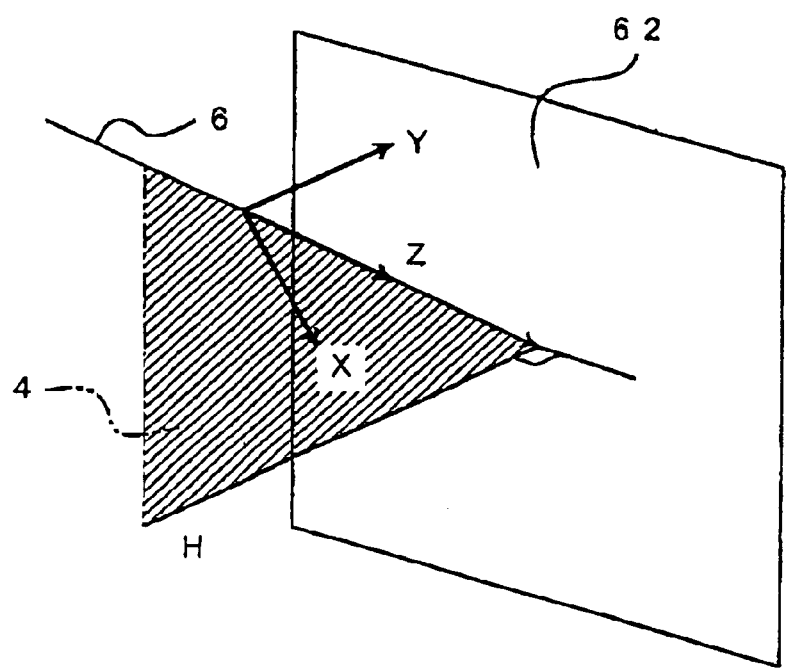
FIG. 4 is a diagram illustrating the relation between the geometric positions of a polarization separation film and a light beam that is incident thereupon.

FIG. 4 illustrates the relation between the geometric positions of the polarization separation film 62 and a light beam impinging thereon. In FIG. 4, the incident plane 4 is an imaginary surface that is defined by the center axis 6 of a light beam falling upon the polarization separation film 62, and a normal H to the polarization separation film 62 that is parallel to X-Z plane.

The polarization separation performance of the polarization separation film 62 has large incidence-angle dependency. That is, when the incidence angle of light increases in the direction of X-axis or Y-axis, which is parallel to the incident plane 4, the polarization separation performance is degraded. As previously described, the polarization separation film 62 reflects the s-polarized light beams included in the illumination light beams and emits the reflected light beams. Moreover, the polarization separation film 62 selects the p-polarized light beams among light beams modulated by the liquid crystal device 80 and emits the selected light beams to the projection lens 90. Therefore, when the polarization separation performance of the polarization separation film 62 is degraded, the quantity of s-polarized light beams introduced to the liquid crystal device 80 decreases. Thus, the efficiency of utilization of light is reduced, so that the brightness of a projection image decreases. Moreover, the film's filter function of selecting specific polarized light from the light modulated by the liquid crystal device 80 is deteriorated. Consequently, the contrast ratio of the projection image is decreased.

Incidentally, the incidence-angle dependency in the direction of X-axis being parallel to the incident plane 4 can be sufficiently reduced by devising the structure of the polarization separation film 62 (for example, selecting a kind of the dielectric film and the manner of constructing the separation film 62). On the other hand, the incidence-angle dependency in the direction of Y-axis being perpendicular to the incident plane 4 is controlled according to the relation between the geometric positions of the polarization separation film 62 and the light impinging thereon. Thus, the problem of the incidence-angle dependency in the direction of Y-axis cannot be solved by devising the structure of the polarization separation film 62. Therefore, to maintain the polarization separation performance of the polarization separation film 62 in the case that light is incident on the polarization separation film 62 at a certain angle, reduction in the incidence angle in the direction of Y-axis being perpendicular to the incident plane 4 is very important.

As described above, this embodiment is shaped so that the distance between a pair of the reflection surfaces 24b and 24d opposed in the direction of Y-axis of the light guide 20 is gradually increased toward the exit end surface 26 from the incidence end surface 22, that is, the following condition holds:

$$SY/SX < MY/MX.$$

Thus, as illustrated in FIG. 2(a), the placement intervals of the light source images S arranged in the direction of Y-axis is decreased. Consequently, the incidence angle in the direction of Y-axis being perpendicular to the incident plane 4 can be reduced. Thus, the polarization separation performance of the polarization separation film 62 can be maintained at a relatively high level. Therefore, a high-contrast-ratio projection image can be realized.

Figure 5:
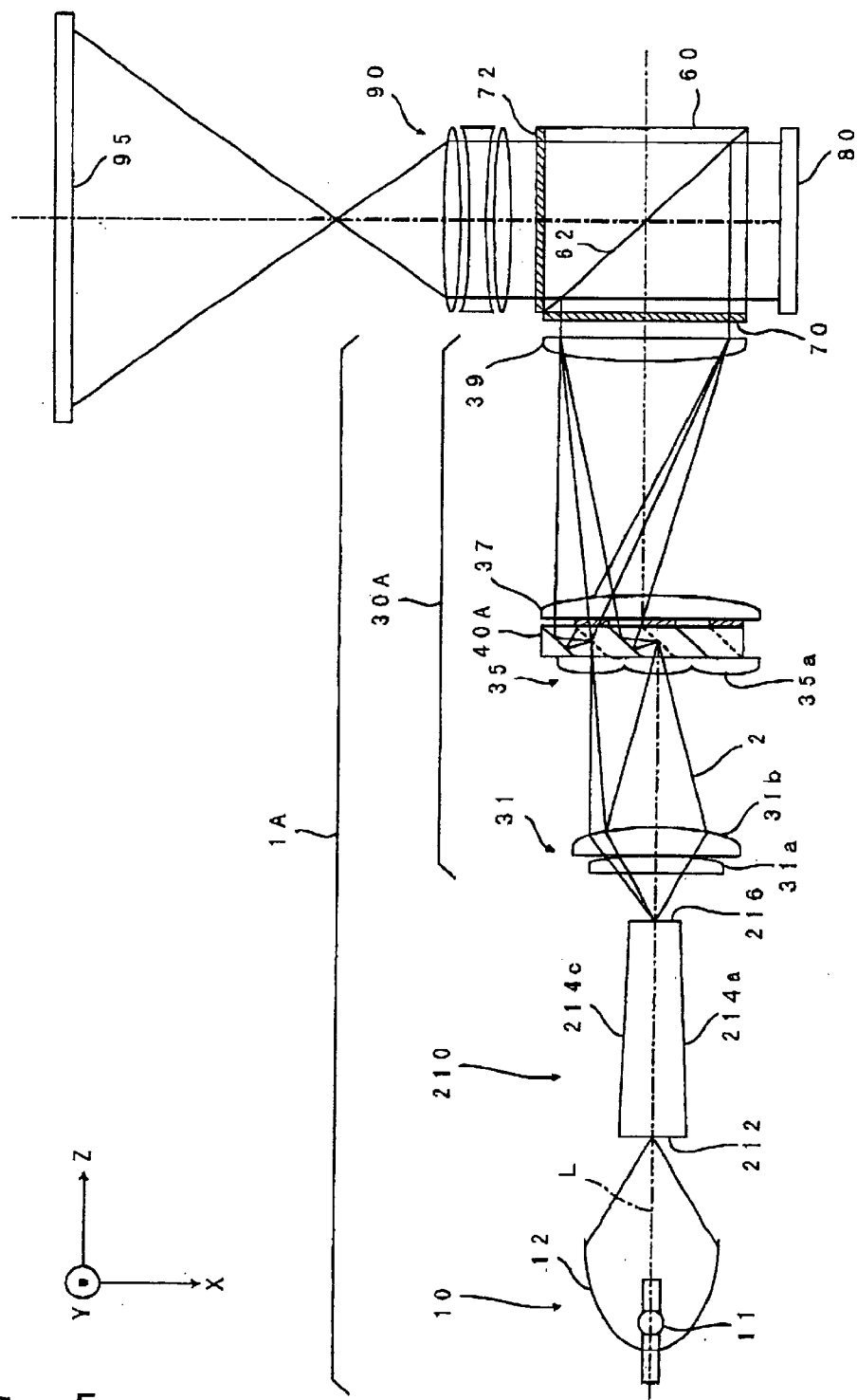
FIG. 5 is a schematic plan view illustrating a second exemplary embodiment of the projector of the present invention.
Figure 6:
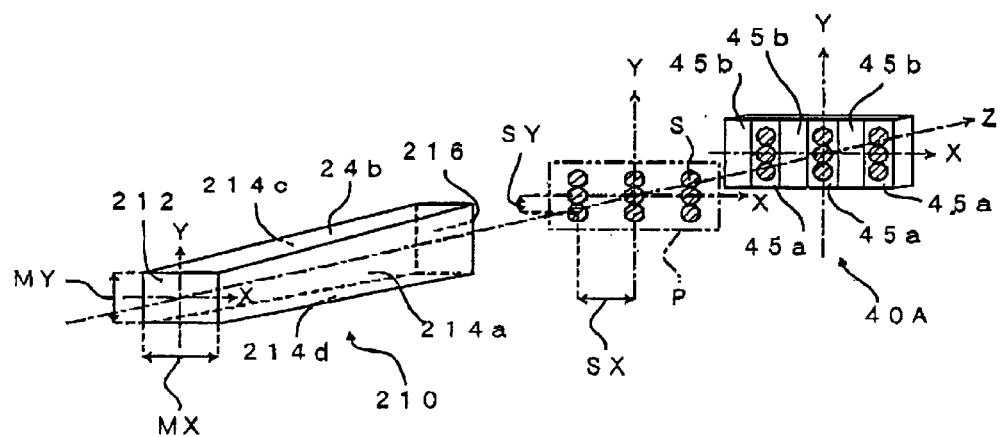
FIG. 6 is a diagram illustrating the relation between the shape of a light guide of the second embodiment and the placement intervals of light source images thereof.

Next, the second exemplary embodiment of the present invention is described hereinbelow with reference to FIGS. 5 and 6. In this embodiment, the distance between the polarization separation film and the reflection film of a polarization conversion element 40A is larger than that of the polarization conversion element 40 of the first embodiment. Further, this embodiment is characterized in that a light guide 210 which differs in shape from the light guide of the first embodiment is used so as to form images S of the light source in accordance with the distance between the polarization separation film and the reflection film of the polarization conversion element 40A. The rest of the second embodiment is similar to the corresponding part of the first embodiment. Furthermore, a modification of each of the constituent elements described in the description of the first embodiment can be applied to the second embodiment. In FIGS. 5 and 6, the same reference characters is used in FIGS. 1 to 4 to designate constituent elements which are similar to those of the first embodiment. Thus, the description of such constituent elements is omitted herein. Incidentally, in FIG. 6, MX designates the length in the direction of X-axis of an incidence end surface 212 of the light guide 210, MY denotes the length in the direction of Y-axis thereof, and SX designates the placement intervals of the light source images S in the direction of X-axis, and SY denotes the placement intervals thereof in the direction of Y-axis.

As shown in FIGS. 5 and 6, the light guide 210 of the second embodiment is a columnar solid rod formed by using a light transmissive light guiding material, and has the incidence end surface 212 on which a light beam is incident, and at least four reflective surfaces 214a, 214b, 214c, and 214d for reflecting and transmitting the light beams, and an exit end surface 216 from which the transmitted light beams are emitted. The shapes of the sections in the X-Y plane of the incidence end surface 212 and the exit end surface 216 are rectangles. The shape of the exit end surface 216 is similar to that of the illumination area of the liquid crystal device 80. The distance between a pair of reflective surfaces 214b and 214d opposed to each other in the direction of Y-axis gradually increases toward the exit end surface 216 from the incidence end surface 212, similarly as in the case of the light guide 20 of the first embodiment. On the other hand, the distance between a pair of reflective surfaces 214a and 214c opposed to each other in the direction of X-axis gradually decreases toward the exit end surface 216 from the incidence end surface 212, differently from the light guide 20 of the first embodiment. With such a configuration, the intervals SY of the light source images in the direction of Y-axis, which are formed from a plurality of partial bundles of light beams 2 emitted from the light guide 210, are narrower than that in the case of the comparative example illustrated in FIG. 2(b). Conversely, the interval SX of the light source images in the direction of X-axis, which are formed from the plurality of sub light beams 2 emitted from the light guide 210, are wider than that in the case of the comparative example. Therefore, in this embodiment, $$SY/SX<MY/MX,$$

similarly as in the case of the first embodiment. However, the intervals SX of the light source images S are wider than that in the case of the first embodiment. Thus, the value of the ratio SY/SX is small.

Incidentally, the light guide 210 of this second embodiment can be replaced with a hollow rod, whose light reflective surface is formed like a cylinder, similarly as the light guide 20 of the first embodiment. The use of a hollow rod enables reduction in the cost of the illumination device 1A, as compared with the case of using a solid rod. Furthermore, the hollow rod contains air whose refractive index is substantially equal to 1. Thus, as compared with the case of using the solid rod whose refractive index is larger than 1, the dimension in the direction of Z-axis of the light guide 210 can be reduced. Consequently, the reduction in the size of the illumination device 1A can be achieved.

The polarization conversion element 40A differs from the polarization conversion element 40 of the first embodiment in that the distance between the polarization separation film and the reflection film is larger than the distance therebetween in the case of the conversion element 40. However, the polarization conversion element 40A is similar to the first polarization conversion element illustrated in FIGS. 3(a) and 3(b) in the other respects.

Hereinafter, the relation between the polarization conversion efficiency of the polarization conversion element 40A and the incidence position of light is described with reference to FIGS. 3(a) and 3(b). As described in the description of the first embodiment, the polarization conversion element 40 (40A) separates light irradiated onto the incidence surface 45a and impinged upon the polarization separation film 42 into a p-polarized light beam and an s-polarized light beam. Further, the polarization conversion element 40 (40A) reflects the s-polarized light by the reflection film 44 in the same direction as that in which the p-polarized light is reflected. Moreover, the polarization conversion element 40 (40A) converts the p-polarized light into the s-polarized light by the retardation film 48. Finally, the polarization conversion element 40 (40A) emits s-polarized light beams. However, when light is irradiated onto the incident surface 45b of the polarization conversion element 40 (40A), this light is incident on the polarization separation film 42 through the reflective film 44. Thus, the polarization separation film 42 transmits a first polarized light beam in the direction of X-axis and reflects a second polarized light beam in the direction of Z-axis. Consequently, polarized light beams, which differ from light having impinged directly on the polarization film 42 through the incident surface 45a thereof, are emitted from the exit surfaces 46A and 46B. That is, although the polarization conversion element 40 (40A) tries to convert a non-polarized light beam into a second polarized light beam, a first polarized light beam will be emitted. Thus, the polarization conversion efficiency is degraded. As is understood from this, it is extremely important for obtaining high polarization conversion efficiency to cause the light beams to be selectively incident only on the incident surface 45a. That is, it is preferable that the distance between the polarization separation film 42 and the reflection film 44 is set so that the incident surface 45a is larger than the light source image S.

In this embodiment, the distance between the polarization separation film 42 and the reflection film 44 of the polarization conversion element 40A is set so that the size of the incident surface 45a is sufficiently larger than the size of the light source image S. Further, the shape of the light guide 210 is set correspondingly to the distance between the polarization separation film 42 and the reflection film 44 of the polarization conversion element 40A so that the intervals SX of the light source images in the direction of X-axis are larger than such intervals as in the case of the first embodiment. Therefore, a light beam emitted from the light guide 210 can be caused to be incident only on a part of the incident surface 45a of the polarization conversion element 40A with sufficient space. Thus, the efficiency of incidence of light onto a polarization separation film 42 can be reliably improved. Consequently, the light utilization efficiency can be enhanced while the polarization conversion efficiency of the polarization conversion element 40A is reliably improved.

Incidentally, in the case that the light source 10 is close to the point light source, the size of the image S of the light source can be made to be relatively small. In such a case, there is no need for increasing the distance between the polarization separation film 42 and the reflection film 44 of the polarization conversion element 40A, similarly as in the case of the second embodiment. That is, this embodiment is extremely effective in the case that the light source 10 is not so close to the point light source, and that the size of the image S of the light source becomes large.

This embodiment is shaped so that the distance between a pair of reflection surfaces 214b and 214d of the light guide 210, which are opposed to each other in the direction of Y-axis, gradually increases toward the exit end surface 216 from the incidence from the incidence end surface 212, similarly as in the case of the first embodiment, that is, the following condition is satisfied:

$$SY/SX<MY/MX.$$

Therefore, the incidence angle in the direction of Y-axis being perpendicular to the incident surface 4 (see FIG. 4) can be reduced. The polarization separation performance of the polarization separation film 62 can be maintained at a relatively high level. Consequently, a bright projection image, which has a high contrast ratio, can be realized.

Next, the third embodiment of the present invention is described hereinbelow with reference to FIGS. 7, 8, 9(a), and 9(b).

Figure 7:
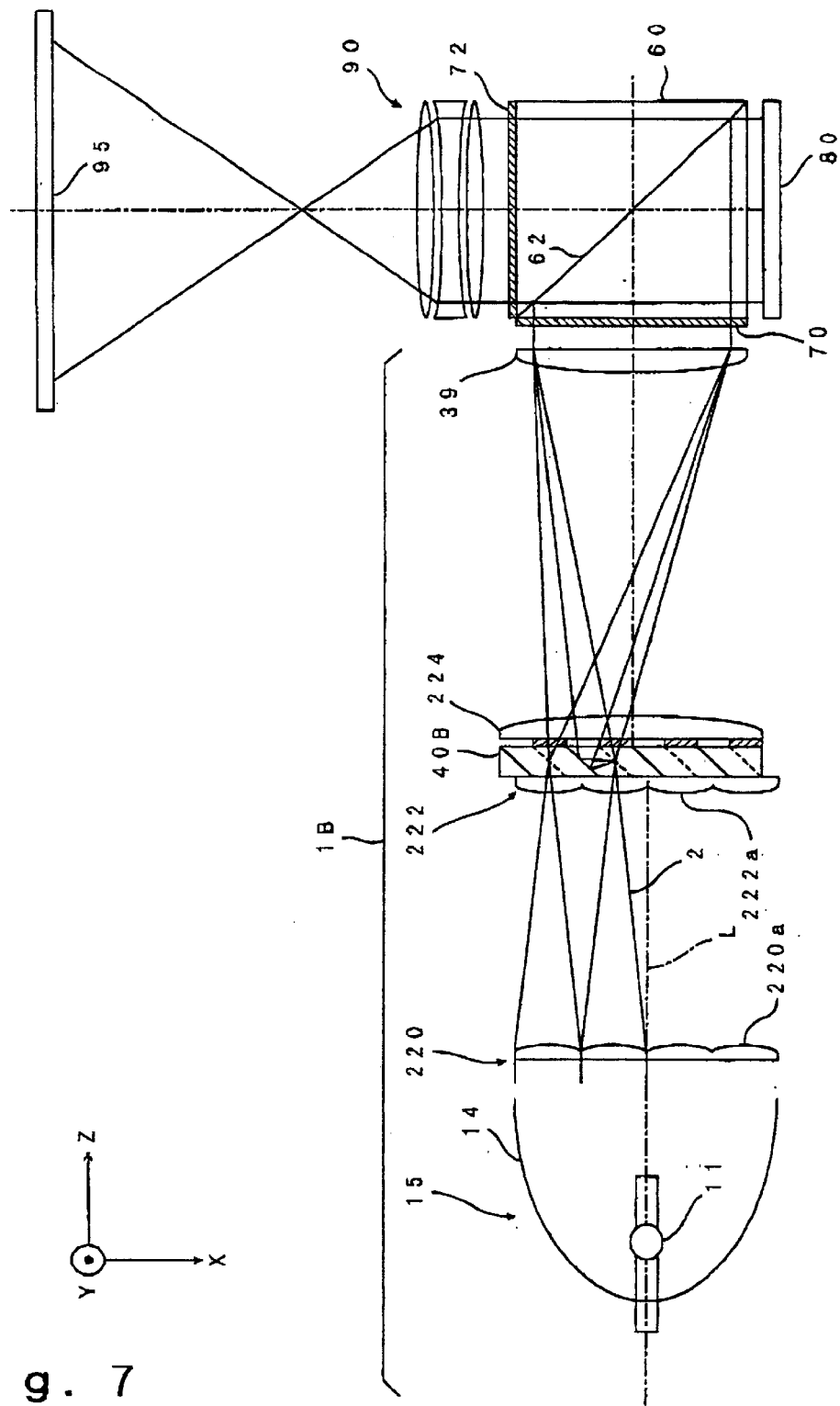
FIG. 7 is a schematic plan view illustrating a third exemplary embodiment of the projector of the present invention.

FIG. 7 is a plan view schematically illustrating the configuration of the third exemplary embodiment of the projector according to the present invention. This embodiment is characterized in that a lens array 220 consisting of a plurality of small lenses 220a is used in the illumination device 1B as the light beam bundle dividing element, instead of the pillar-like light guide. In this embodiment, the constituent elements similar to those of the first embodiment are designated by the same reference characters as used for denoting the corresponding elements of the first embodiment in FIGS. 1 to 4. Thus, the description of such constituent elements is omitted herein.

The illumination device 1B has the light source 15, the lens array 220, the first transmitter lens 222, the polarization conversion element 40B, the second transmitter lens 224, and the collimating lens 39. The illumination device 1B divides light emitted from the light source 15 into a plurality of sub light beams 2, and then converts each of the sub light beams 2 into a single kind of polarized light beams by using the polarization conversion element 40B, and subsequently, superposes the polarized light beams on an illumination area of the liquid crystal device 80.

The light source 15 has a light emitting tube 11 for radiating light, and a parabolic reflector 14 for collecting the light radiated from the light emitting tube 11. The reflector is not limited to a parabolic one. An elliptic reflector or a spherical reflector can be used according to the constituent elements, such as the lens array 220, the transmitter lenses 222, 224, and the polarization conversion element 40B, which are arranged at the downstream side of an optical path from the light source 15.

Figure 8:
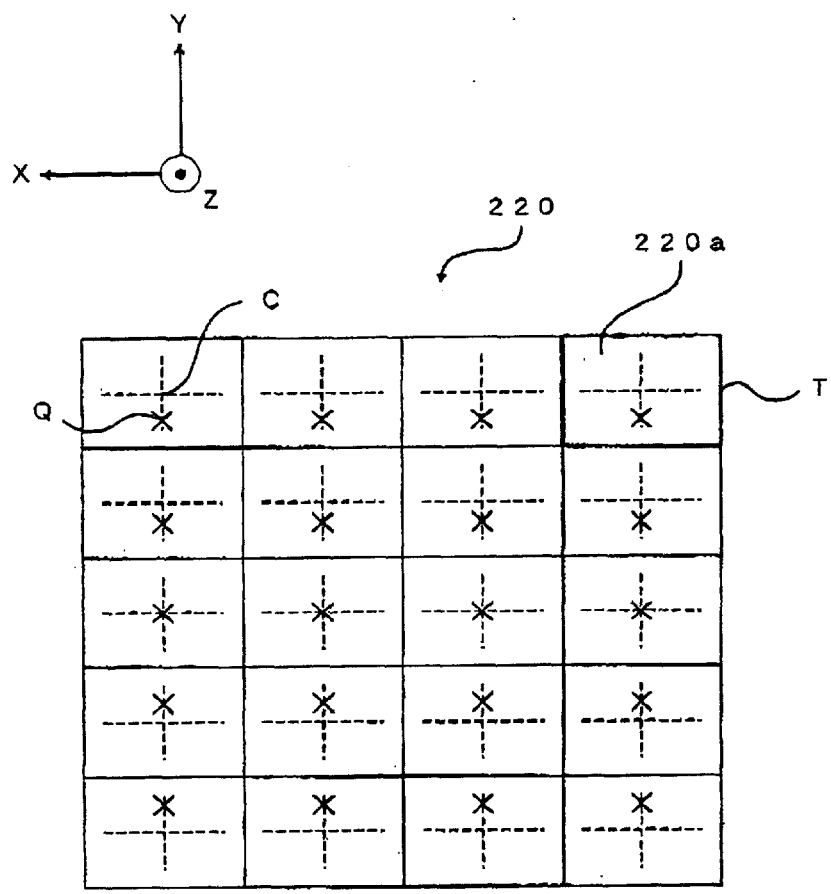
FIG. 8 is a plan view illustrating the configuration of a lens array of the third embodiment.

The lens array 220 consists of a plurality of small lenses 220a arranged in a matrix. The contour T of each of the small lenses 220a is similar to the shape of the illumination area of the liquid crystal device 80. The light beam emitted from the light source 15 is divided into a plurality of sub light beams 2 by the condensing action of each of the small lenses 220a of the lens array 220. Thus, a number of the light source images S that is equal to that of the small lenses 220a are formed in the X-Y plane (or imaginary place P) substantially perpendicular to the illumination optical axis L. As illustrated in FIG. 8, each of the small lenses 220a of the lens array 220 is a decentered lens, whose optical axis Q is deviated from the geometrical center C thereof in the direction of Y-axis.

Figure 9A:
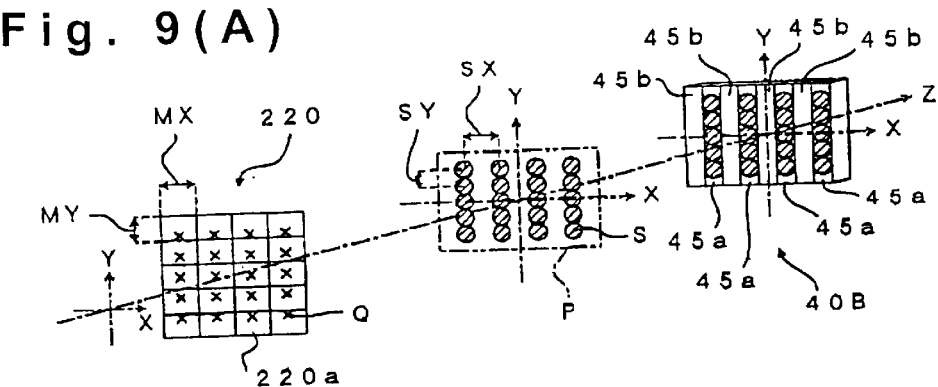
FIG. 9(a) is a diagram illustrating the relation between the condensing characteristics of small lenses of the lens array of the third embodiment and the placement intervals of the light source images.
Figure 9B:
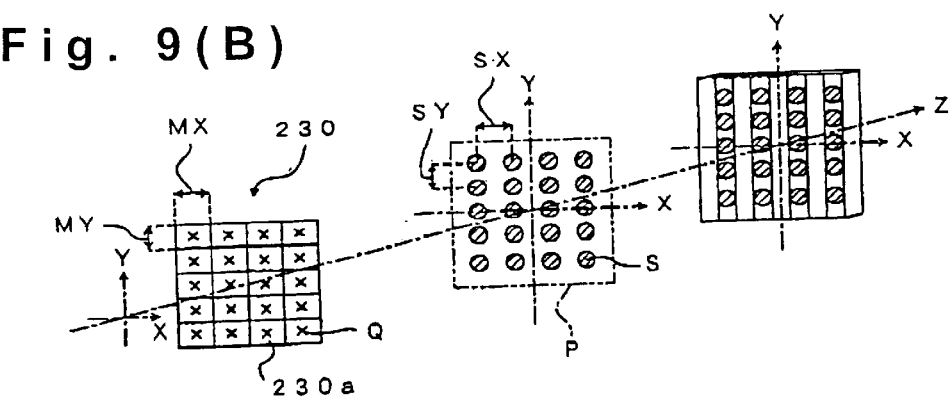
FIG. 9(b) is a diagram illustrating the relation between the condensing characteristics of small lenses of the lens array of the comparative example and the placement intervals of the light source images.

Next, the relation between the condensing characteristic of the small lenses 220a of the lens array 220 and the placement intervals of the light source images S is described hereinbelow with reference to FIGS. 9(a) and 9(b). FIG. 9(a) is a diagram illustrating the relation between the condensing characteristic of the small lenses 220a of the lens array 220 and the placement intervals of the light source images S. FIG. 9(b) illustrates a comparative example of replacing the lens array 220 with a lens array 230 constituted by using no decentered lens. In FIGS. 9(a) and 9(b), MX denotes the length of the contour T of the small lenses 220a and 230a of the lens arrays 220 and 230 in the direction of X-axis, MY designates the length of the contour T in the direction of Y-axis, SX denotes the placement intervals of the light source images S in the direction of X-axis, and SY designates the placement intervals of the light source images S in the direction of the Y-axis. In the case of the comparative example of FIG. 9(b), the following condition holds:

$SY/SX=MY/MX.$

Incidentally, the placement intervals of the light source images S, which are formed in the imaginary plane P, can be arbitrarily controlled by regulating the condensing characteristics of each of the small lenses of the lens array. In this embodiment, the condensing characteristics are set by deviating the position of the optical axis Q of each of the small lens 220a of the lens array from the geometrical center C thereof so that the placement intervals SY of the light source images in the direction of Y-axis are small in comparison with the case of the comparative example illustrated in FIG. 9(b). Therefore, in the case of this embodiment, the following relation holds:

$SY/SX<MY/MX.$

The reason for setting the small lenses 220a of the lens array 220 in such a manner as to have such condensing characteristics is that the polarization separation performance of the polarization separation film 62 is maintained, similarly as in the case of the first embodiment.

The first transmitter lens 222 disposed at the incidence side of the polarization conversion element 40B has similar functions as those of the first transmitter lens 35 (see FIG. 1) of the first embodiment. The transmitter lens 222 consists of a number of small lenses 222a that is equal to that of the small lenses 220a of the lens array 220, and is configured so that the positions of the small lenses 222a correspond to the positions at which a plurality of the light source images S are formed. Although there is no restriction on the shape of the contour of each of the small lenses 222a, it is convenient for facilitating the placement of the small lenses 222a that the shape of the contour of each of the small lenses 222a is set to be a rectangle or a hexagon. Furthermore, the small lenses 222a are decentered lenses, which are similar to the small lenses 220a. The condensing characteristics of each of the small lenses 222a are set so that the sub light beams condensed by the small lenses 220a of the lens array 220 are made to be incident substantially at right angles on the incident surface 45a of the polarization conversion element 40B. Therefore, light can be incident on the polarization separation film of the polarization conversion element 40B substantially at an incidence angle of 0. Thus, the polarization conversion efficiency is good. Incidentally, the first transmitter lens 222 is not always necessary for this projector.

The polarization conversion element 40B differs from the conversion element 40 in that the numbers of the polarization separation films, the reflection films, and transmissive members disposed thereamong are large, as compared with the case of the element 40 of the first embodiment. However, the rest of the element 40B does not differ from the corresponding part of the element 40. Therefore, the detail description of the element 40B is omitted herein.

The second transmitter lens 224 placed at the exit side of the polarization conversion element 40B has a function similar to that of the second transmitter lens 37 of the first embodiment, that is, the function of superposing the sub light beams divided by the lens array 220 onto the illumination area of the liquid crystal device 80. In this embodiment, the second transmitter lens 224 is constituted by a spherical lens having an axially symmetric shape. However, the lens 224 is not limited to such a spherical lens. For instance, a lens array, a Fresnel lens, or a complex lens which is a combination of a plurality of lenses, may be used as the second transmitter lens 224. In the case of using such a lens, various kinds of optical aberration can be reduced. Furthermore, in the case of using the Fresnel lens, a thickness at the center of the lens can be decreased. This is convenient for reducing the weight of the illumination device 1B.

As described above, in this embodiment, the condensing characteristics of the small lens 220a of the lens array 220 are set so that the following relation holds:

$SY/SX<MY/MX.$

Consequently, the placement intervals SY of the light source images S in the direction of Y-axis o become smaller. Therefore, in this embodiment, the incidence angle in the direction of Y-axis being perpendicular to the incident surface 4 (see FIG. 4) can be set at a small value, similarly as in the case of the first embodiment. Thus, the polarization separation performance of the polarization separation film 62 can be maintained at a relatively high level. Consequently, a bright projection image, which has a relatively high contrast ratio, can be realized.

Incidentally, in this embodiment, all of the small lenses 220a of the lens array 220 are decentered lenses. However, lenses, which are not decentered, may be used as a part of the small lenses 220a. Incidentally, in this embodiment, the condensing characteristics of the small lenses 220a are set so that the placement intervals of the light source images in the direction of the Y-axis are narrower. However, those of the small lenses 220a may be set so that the placement intervals SY of the light source images S in the direction of the Y-axis is narrower, and that the placement intervals of the light source images S in the direction of X-axis become wider, similarly as in the case of the second embodiment. In the case that the condensing characteristics of the small lenses are set in this manner, similarly as in the case of the second embodiment, the polarization separation efficiency of the polarization conversion element 40B can be improved even when the light source is not so close to the point light source. Consequently, the light utilization efficiency of the projector can be enhanced.

Figure 10:
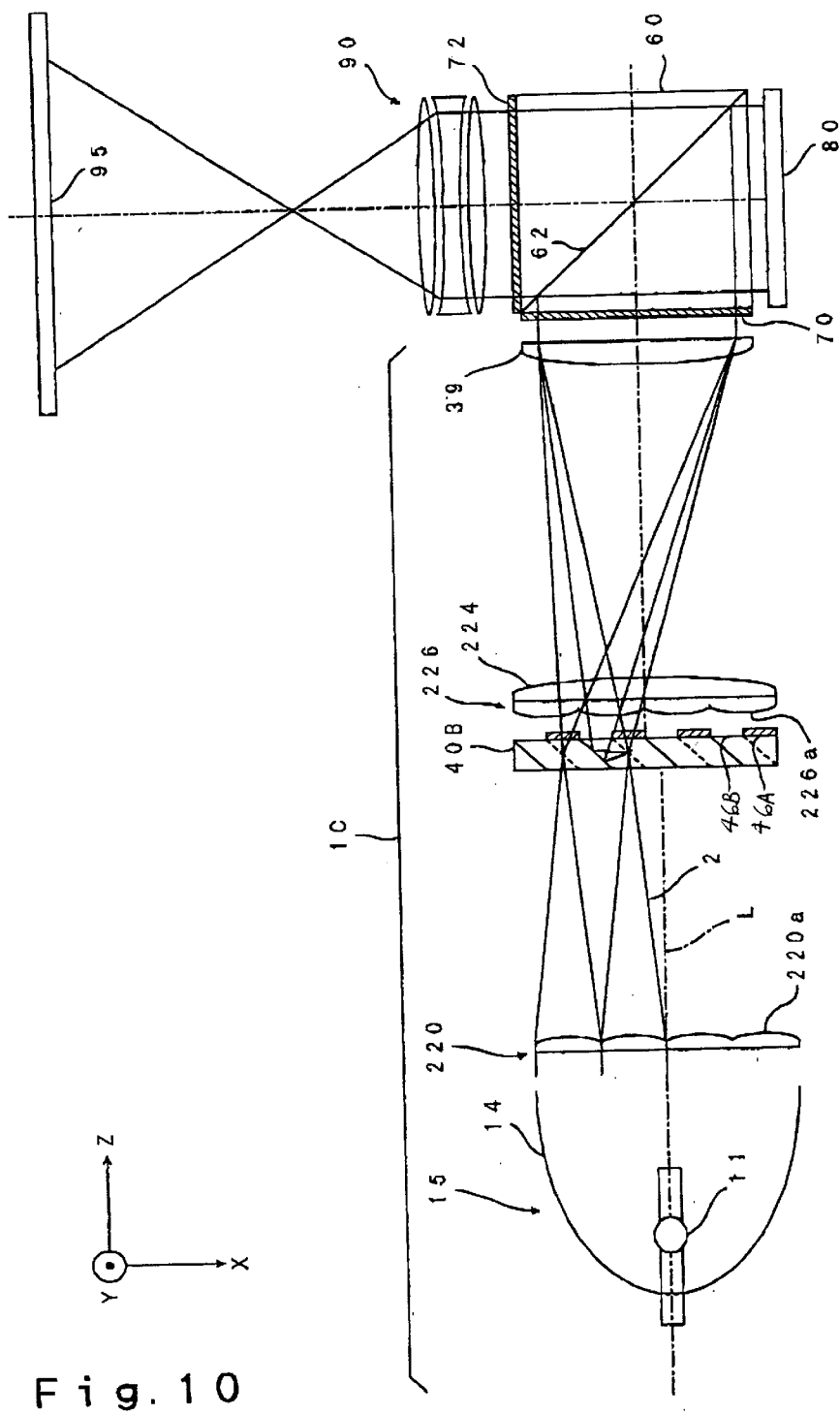
FIG. 10 is a schematic plan view illustrating a fourth exemplary embodiment of the projector of the present invention.

Next, the fourth embodiment of the present invention is described by referring to FIG. 10.

FIG. 10 is a plan view schematically illustrating the configuration of the fourth exemplary embodiment of the present invention. This embodiment is a modification of the third embodiment described above, and differs from the third embodiment in that the first transmitter lens 226 is disposed between the polarization conversion element 40B and the second transmitter lens 224 in the illumination device 1C. The remaining constituent elements of the fourth embodiment are similar to those of the third embodiment. Further, the modification of the constituent elements described in the description of the third embodiment can be applied to the fourth embodiment. Incidentally, in this embodiment, the constituent elements similar to those of the first embodiment are designated by the same reference characters used in FIGS. 1 to 4. The description of such constituent elements is omitted herein. Furthermore, constituent elements similar to those of the third embodiment are designated by the same reference characters used in FIGS. 7 to 9. The description of these constituent elements is omitted herein.

The first transmitter lens 226 is constituted by a plurality of small lenses 226a, similarly as the first transmitter lens 222 of the third embodiment. Although the first transmitter lens 222 of the third embodiment has the function of causing each of the sub light beams 2 to be incident on the incident surface 45a of the polarization conversion element 40B substantially at a right angle, the first transmitter lens 226 of the fourth embodiment does not have such a function, because the lens 226 is disposed at the exit side of the polarization conversion element 40B. This embodiment is configured so that the lenses disposed at the incidence side of the polarization conversion element 40B in the case of the third embodiment are omitted. Therefore, the fourth embodiment is suitable for the case that the characteristics, for instance, parallelism, of a light beam emitted from the light source are good.

Fundamental advantages of the fourth embodiment are similar to those of the third embodiment. However, according to the fourth embodiment, the number of boundary surfaces can be decreased by optically integrally forming the first transmitter lens 226 and the second transmitter lens 224. Thus, the fourth embodiment has the advantage in that the light loss can be reduced. Furthermore, the first transmitter lens 226 also has the function of the second transmitter lens 224 so that the second transmitter lens 224 can be omitted, and that the cost of the illumination device can be reduced.

Incidentally, in the fourth embodiment, a single small lens 226a corresponds to a set of the exit surfaces 46A and 46B of the polarization conversion element 40B. However, the small lens 226a may be disposed in such a manner as to correspond to the exit surfaces 46A and 46B of the polarization conversion element 40B in a one-to-one relationship. That is, the first transmitter lens 226 can be constituted by using a number of small lenses that is twice the number of the small lenses 226a shown in FIG. 10. Consequently, the light utilization efficiency can be improved still more.

Next, the fifth embodiment of the present invention is described hereinbelow by referring to FIGS. 11 to 14.

Figure 11:
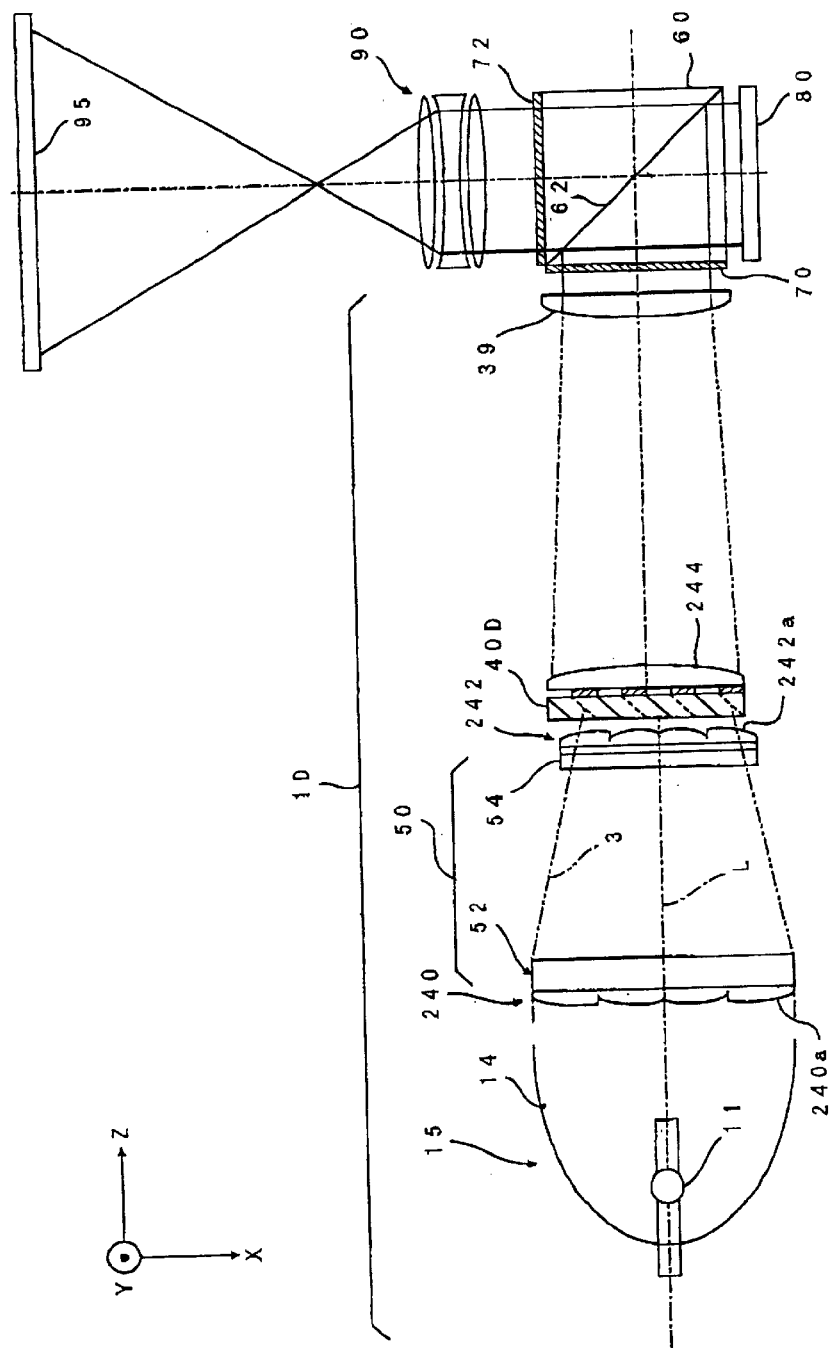
FIG. 11 is a schematic vertical sectional view illustrating a fifth exemplary embodiment of the projector of the present invention.
Figure 12:
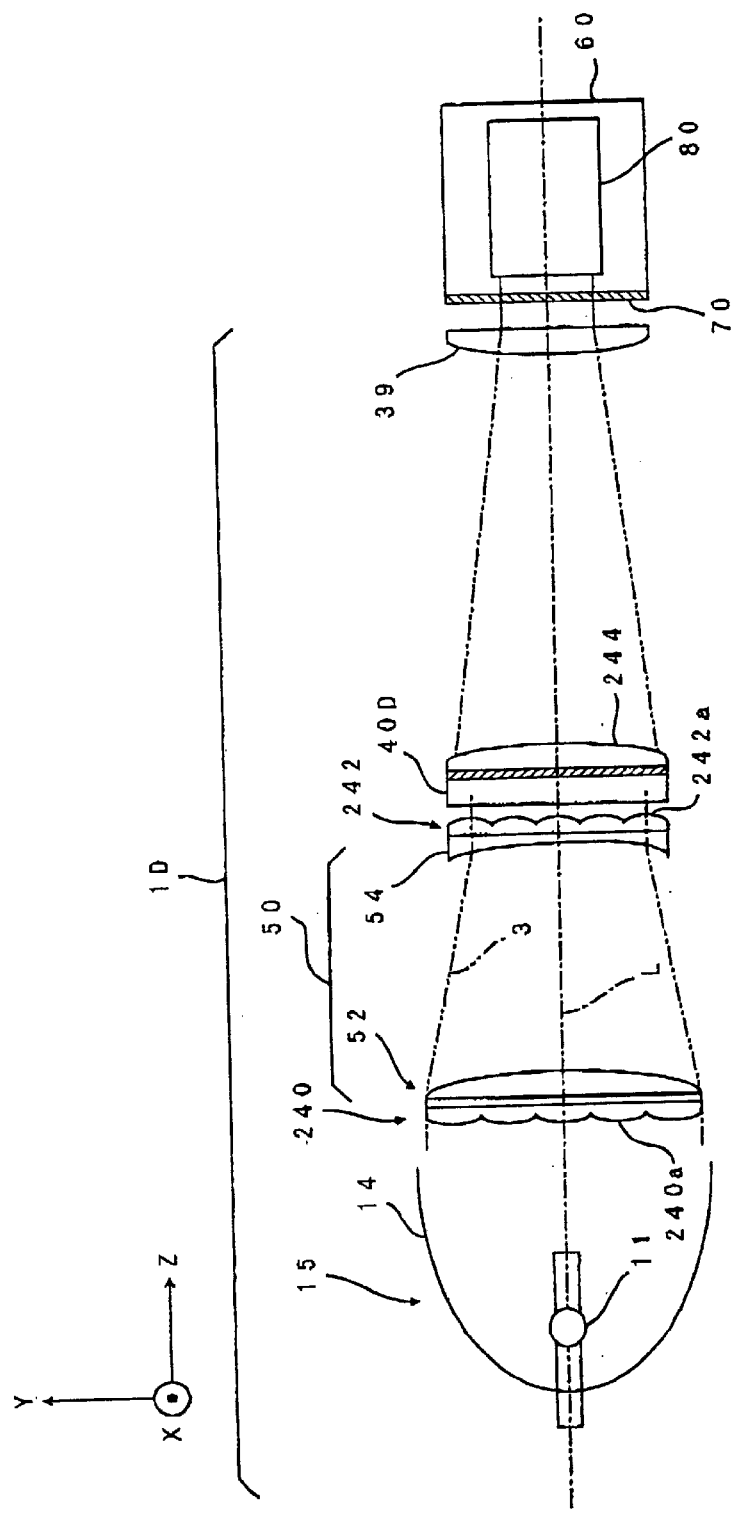
FIG. 12 is a schematic plan view illustrating the fifth embodiment of the projector of the present invention.

FIGS. 11 and 12 schematically illustrate the configuration of the fifth exemplary embodiment of the projector of the present invention. FIG. 11 is a schematic vertical sectional view illustrating the fifth embodiment in the X-Y plane. FIG. 12 is a schematic plan view illustrating the fifth embodiment, which is taken when viewed from the direction of X-axis.

This fifth embodiment is characterized in that the placement intervals SX of the plurality of light source images in the direction of X-axis, which are formed in a matrix by using the lens array 240, is decreased, and that the placement intervals SY thereof in the direction of Y-axis is decreased by using the afocal optical system 50 serving as a reduction optical system. In this embodiment, the constituent elements similar to those of the first embodiment are designated by the same reference character used in FIGS. 1 to 4. Further, the description of such constituent elements is omitted herein.

The illumination device 1D has the light source 15, the lens array 240, the afocal optical system 50, the first transmitter lens 242, the polarization conversion element 40D, the second transmitter lens 244, and the collimating lens 39. The illumination device 1D divides the light emitted from the light source 15 into a plurality of partial bundles of light beams using the lens array 240. Then, the device 1D converts the sub light beams into a single kind of the polarized light. Thereafter, the device 1D superpose the polarized light beams on the illumination area of the liquid crystal device 80.

The light source 15 is the same as that 15 of the illumination device 1B of the third embodiment (see FIG. 7).

Figure 13:
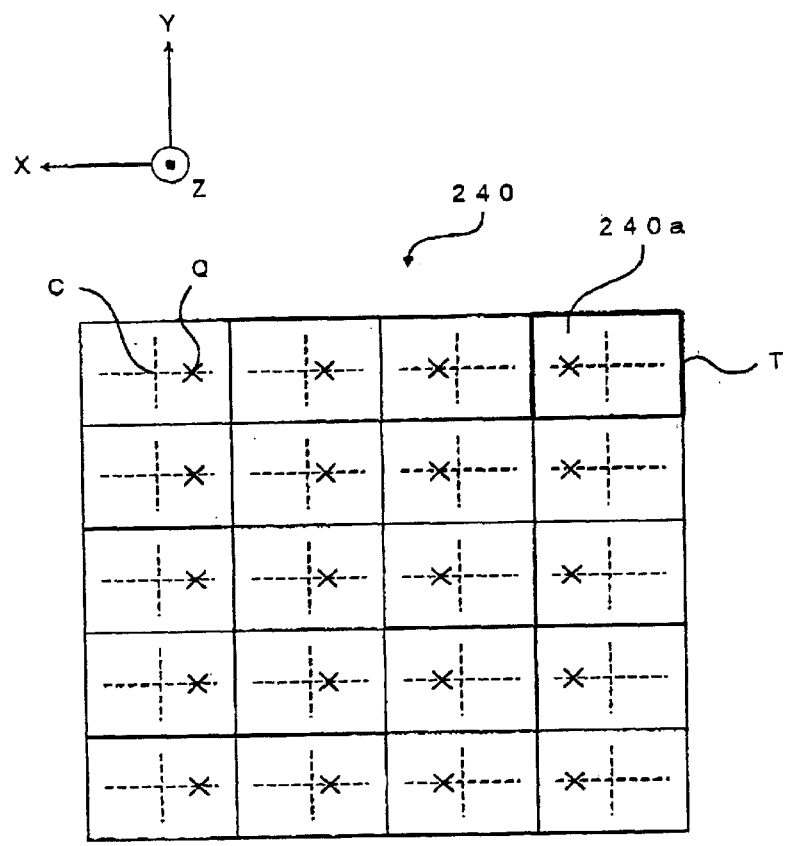
FIG. 13 is a plan view illustrating the configuration of a lens array of the fifth embodiment.
Figure 14:
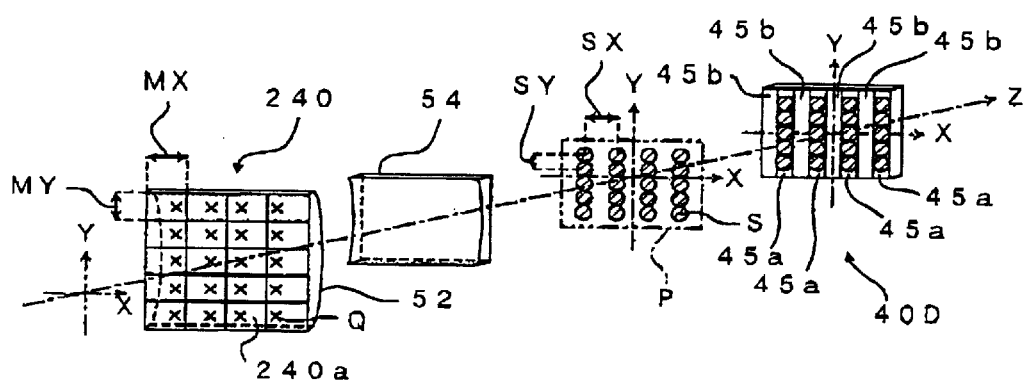
FIG. 14 is a diagram illustrating the relation between the condensing characteristics of small lenses of the lens array of the fifth embodiment and the placement intervals of the light source images.

The lens array 240 is constituted by a plurality of small lenses 240a disposed in a matrix. The contour T of each of the small lenses 240a is similar to the shape of the illumination area of the liquid crystal device 80. A light beam emitted from the light source 15 is divided by the condensing action of each of the small lenses 240a of the lens array 240 into a plurality of sub light beams. Thus, a number of the light source images S that is equal to the number of the small lenses 240a are formed in the X-Y plane (or imaginary plane P), which is substantially perpendicular to the illumination optical axis L. As illustrated in FIG. 13, each of the small lenses 240a of the lens array 240 is a decentered lens whose optical axis Q is deviated in the direction of X-axis from the geometrical center C thereof. This embodiment employs such a lens array 240, so that as shown in FIG. 14, the placement intervals SX of the light source images S in the direction of the X-axis becomes smaller, as compared with the comparative example illustrated in FIG. 9(b).

The afocal optical system 50 has the function of reducing the diameter of the entire light beam while almost completely maintaining the parallelism of the light beam passing therethrough, as illustrated in FIG. 12. The afocal optical system 50 of this embodiment is constituted by a cylindrical convex lens 52 and a cylindrical concave lens 54, each of which has curvature only in the direction of Y-axis. Incidentally, the functions equivalent to those of the cylindrical lenses 52 and 54 can be implemented by a complex lens, which is constituted by a combination of two or more lenses. This has an advantage in that the optical aberration can be reduced. The cylindrical convex lens 52 is disposed at the exit side of the lens array 240, so that the light beam 3 passing through the cylindrical convex lens 52 is refracted only in the direction of Y-axis and inwardly deflected to the direction of the illumination optical axis L. The cylindrical concave lens 54 is disposed at the incidence side of the first transmitter lens 242 and makes the light beam inwardly deflected by the cylindrical convex lens 52 to be substantially parallel to the illumination optical axis L. This embodiment employs such an afocal optical system 50, so that the placement intervals of the light source images SY in the direction of the Y-axis are smaller as illustrated in FIG. 14, in comparison with the comparative example illustrated in FIG. 9(b).

The first transmitter lens 242 disposed at the incidence side of the polarization conversion element 40D has functions similar to those of the first transmitter lens 35 (see FIG. 1) of the first embodiment. The first transmitter lens 242 consists of the small lenses 242a of a number equal to that of the small lenses 240a of the lens array 240, and is configured so that the position of each of the small lenses 242a corresponds to the positions at which a plurality of the images S of the light source are formed. Although there is no restriction on the shape of the contour of each of the small lenses 242a, it is convenient for facilitating the placement of the small lenses 242a that the shape of the contour of each of the small lenses 242a is set to be a rectangle or a hexagon. Furthermore, the small lenses 242a are decentered lenses, which are similar to the small lenses 240a. The condensing characteristics of each of the small lenses 242a are set so that the sub light beams condensed by the small lenses 240a of the lens array 240 are made to be incident substantially at right angles on the incident surface 45a of the polarization conversion element 40D. Therefore, light can be incident on the polarization separation film of the polarization conversion element 40D substantially at an incidence angle of 0. Thus, the polarization conversion efficiency is good. Incidentally, the first transmitter lens 242 is not always necessary for this projector.

The polarization conversion element 40D differs from the conversion element 40B in that the former is a size larger than the latter, as compared with that of the element 40B. However, the rest of the element 40D does not differ from the corresponding part of the element 40B. Therefore, the detail description of the element 40D is omitted herein.

The second transmitter lens 244 placed at the exit side of the polarization conversion element 40D has a function similar to that of the second transmitter lens 37 of the first embodiment, that is, the function of superposing the sub light beams, which are divided by the lens array 240, on the illumination area of the liquid crystal device 80. In this embodiment, the second transmitter lens 244 is constituted by a spherical lens having an axially symmetric shape. However, the lens 244 is not limited to such a spherical lens. For instance, a lens array, a Fresnel lens, or a complex lens which is a combination of a plurality of lenses, may be used as the second transmitter lens 244. In the case of using such a lens, various kinds of optical aberration can be reduced. Furthermore, in the case of using the Fresnel lens, the center thickness of the lens can be decreased. This is convenient for reducing the weight of the illumination device 1D.

The fifth embodiment uses the lens array 240 and the afocal optical system 50 to thereby make each of the placement intervals SX of the light source images S in the direction of the X-axis and the placement intervals SY thereof in the direction of the Y-axis narrower than the corresponding interval in the case of the comparative example illustrated in FIG. 9(b). Similarly as in the case of the first to fourth embodiments, the characteristics of the lenses 52 and 54 of the afocal optical system are set so that the following conditions are met:

$$SY/SX < MY/MX.$$

Therefore, in the case of the fifth embodiment, the incidence angle in the direction of Y-axis being perpendicular to the incident plane 4 (see FIG. 4) can be reduced, similarly as in the case of the first embodiment. Thus, the polarization separation performance of the polarization separation film 62 can be maintained at a relatively high level. Consequently, a bright projection image having a high contrast ratio can be realized.

Furthermore, in this embodiment, not only the placement intervals SY of the light source images S in the direction of Y-axis but also the placement intervals SX thereof in the direction of X-axis are reduced by using the lens array 240. Thus, the size of the optical element disposed at the downstream side of the optical path from the lens array 240 can be decreased. Consequently, the reduction in the size and weight of the projector can be achieved.

Incidentally, in this embodiment, all of the small lenses 240a of the lens array 240 are decentered lenses. However, lenses, which are not decentered, may be used as a part of the small lenses 240a. Further, in this embodiment, the placement intervals SX of the light source images S in the direction of the X-axis are set to be small. However, it is not always necessary to narrow the placement intervals SX of the light source images S in the direction of X-axis. In this case where the intervals SX is not narrowed, it is sufficient that all the small lenses 240a of the lens array 240 are constituted by ordinary lenses, which are not decentered. Alternatively, the placement interval SX in the direction of X-axis of the images S of the light source may be set to be wide, similarly as in the case of the second embodiment. In this case, similarly as in the case of the second embodiment, the polarization separation efficiency of the polarization conversion element 40D can be improved even when the light source is not so close to the point light source. Consequently, the light utilization efficiency of the projector can be enhanced.

Additionally, when the dimension of each of the light source image S is small, both the cylindrical convex lens 52 and the cylindrical concave lens 54 can be respectively replaced with an ordinary convex lens and an ordinary concave lens, each of which has curvature in the two directions, namely, both directions of X-axis and Y-axis, or replaced with toric lenses.

Next, the sixth embodiment of the present invention is described hereinbelow by referring to FIGS. 15 and 16.

Figure 15:
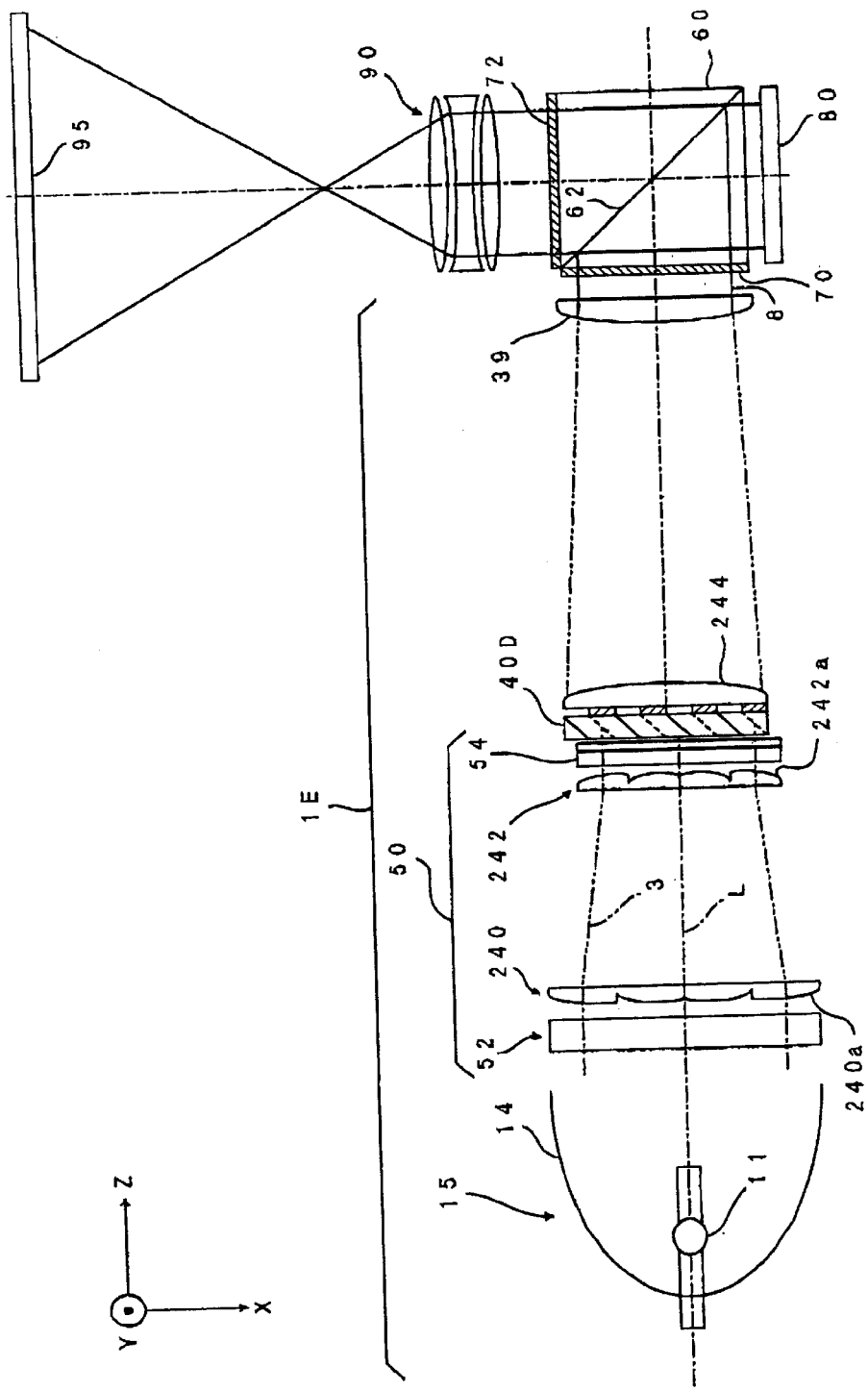
FIG. 15 is a schematic vertical sectional view illustrating a sixth exemplary embodiment of the projector of the present invention.
Figure 16:
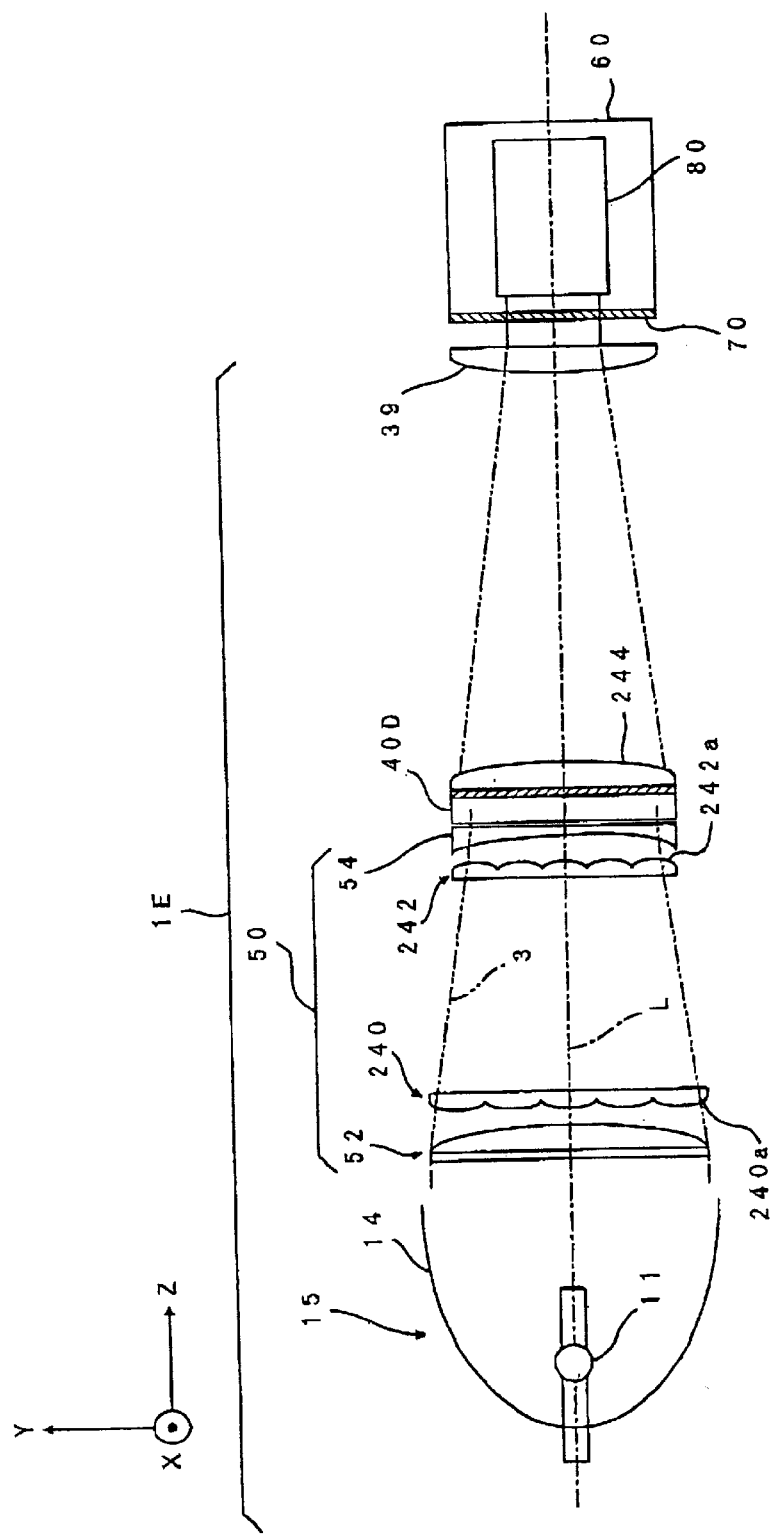
FIG. 16 is a schematic plan view illustrating the sixth embodiment of the projector of the present invention.

FIGS. 15 and 16 schematically illustrate the configuration of the sixth exemplary embodiment of the projector of the present invention. FIG. 15 is a schematic vertical sectional view illustrating the sixth embodiment in the X-Z plane. FIG. 16 is a plan view illustrating the sixth embodiment, which is taken when viewed from the direction of X-axis. This embodiment is a modification of the fifth embodiment described above, and differs from the fifth embodiment in that the cylindrical convex lens 52 of the afocal optical system 50 is disposed at the incidence side of the lens array 240 in the illumination device 1E, and that the cylindrical concave lens 54 is disposed at the exit side of the first transmitter lens 242. The rest of the sixth embodiment is similar to the corresponding part of the fifth embodiment. Further, the modifications of the constituent elements of the fifth embodiment described in the description thereof can be applied to the sixth embodiment. Incidentally, in these figures showing this embodiment, reference characters used in FIGS. 1 to 4 designate constituent elements similar to the corresponding ones of the first embodiment. Moreover, reference characters used in FIGS. 11 to 14 designate constituent elements similar to the corresponding ones of the fifth embodiment.

The sixth embodiment, in which the positions of the cylindrical convex lens 52 and the cylindrical concave lens 54 of the afocal optical system 50 are changed from those in the fifth embodiment, can have advantages similar to those of the fifth embodiment.

Incidentally, the position at which the afocal optical system 50 is inserted is not limited to those in the case of the fifth and sixth embodiments, and can be arbitrarily set between the light source 15 and the polarization beam splitter 60. Further, whatever place therebetween the afocal optical system 50 is inserted to, advantages similar to those of the fifth embodiment can be achieved as long as the condensing characteristics of the small lenses 240a of the lens array 240 and the characteristics of the lenses 52 and 54 of the afocal optical system 50 are set so that the following relation holds $$SY/SX < MY/MX.$$

Furthermore, in the fifth and sixth embodiments, the placement intervals SX of the light source images S in the direction of X-axis and the placement intervals SY thereof in the direction of Y-axis are reduced by controlling the condensing characteristics of the small lenses 240a of the lens array 240 and the characteristics of the lenses 52 and 54 of the afocal optical system 50. However, such a function of reducing the placement intervals SX and SY of the images S can be implemented only by the afocal optical system 50. Thus, the lens array 240 can be configured without using decentered lenses, so that the simplification of the configuration of the illumination device and the reduction in size, weight, and cost of the projector can be achieved.

Next, the seventh embodiment of the present invention is described hereinbelow with reference to FIGS. 17 to 21.

Figure 17:
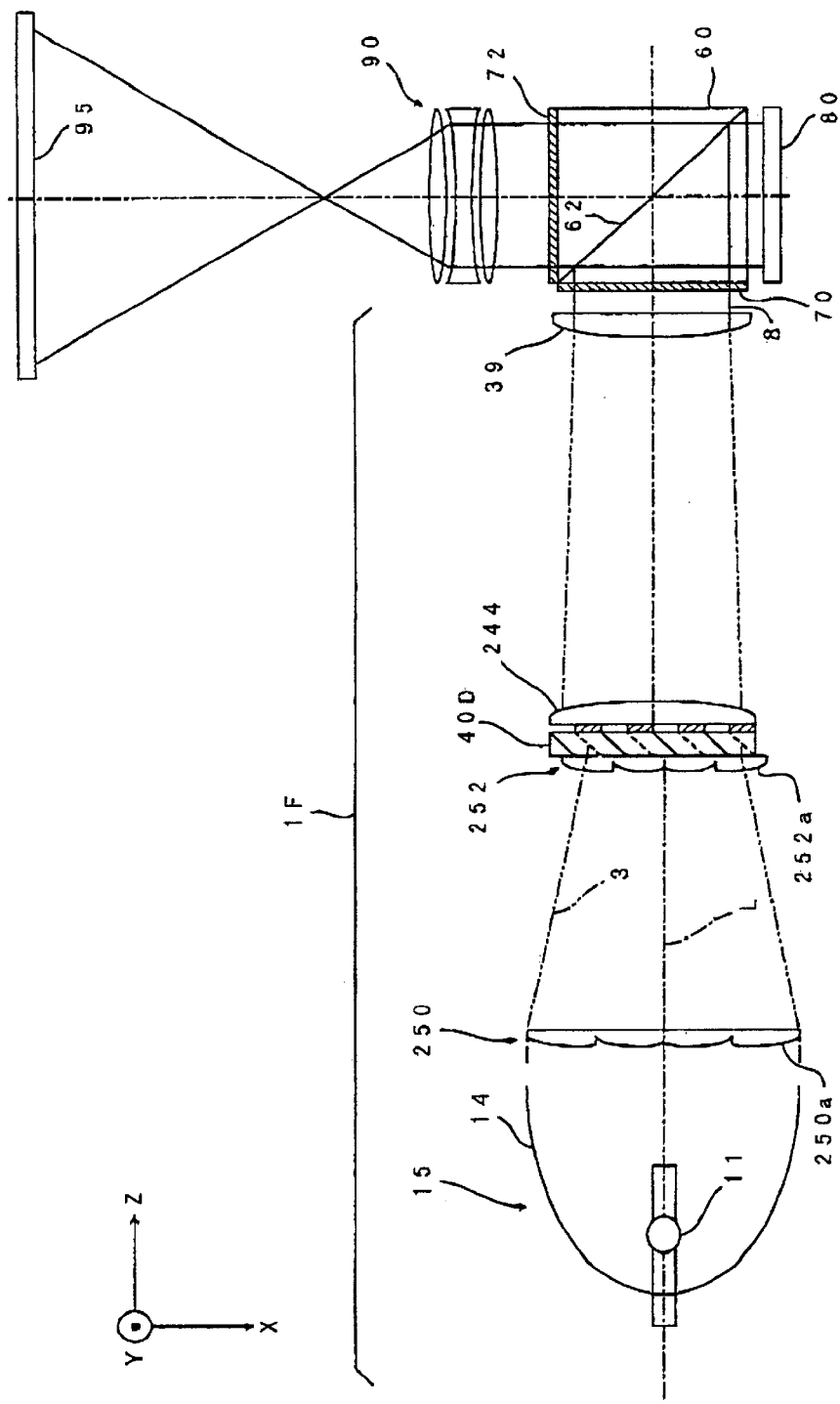
FIG. 17 is a schematic vertical sectional view illustrating a seventh exemplary embodiment of the projector of the present invention.
Figure 18:
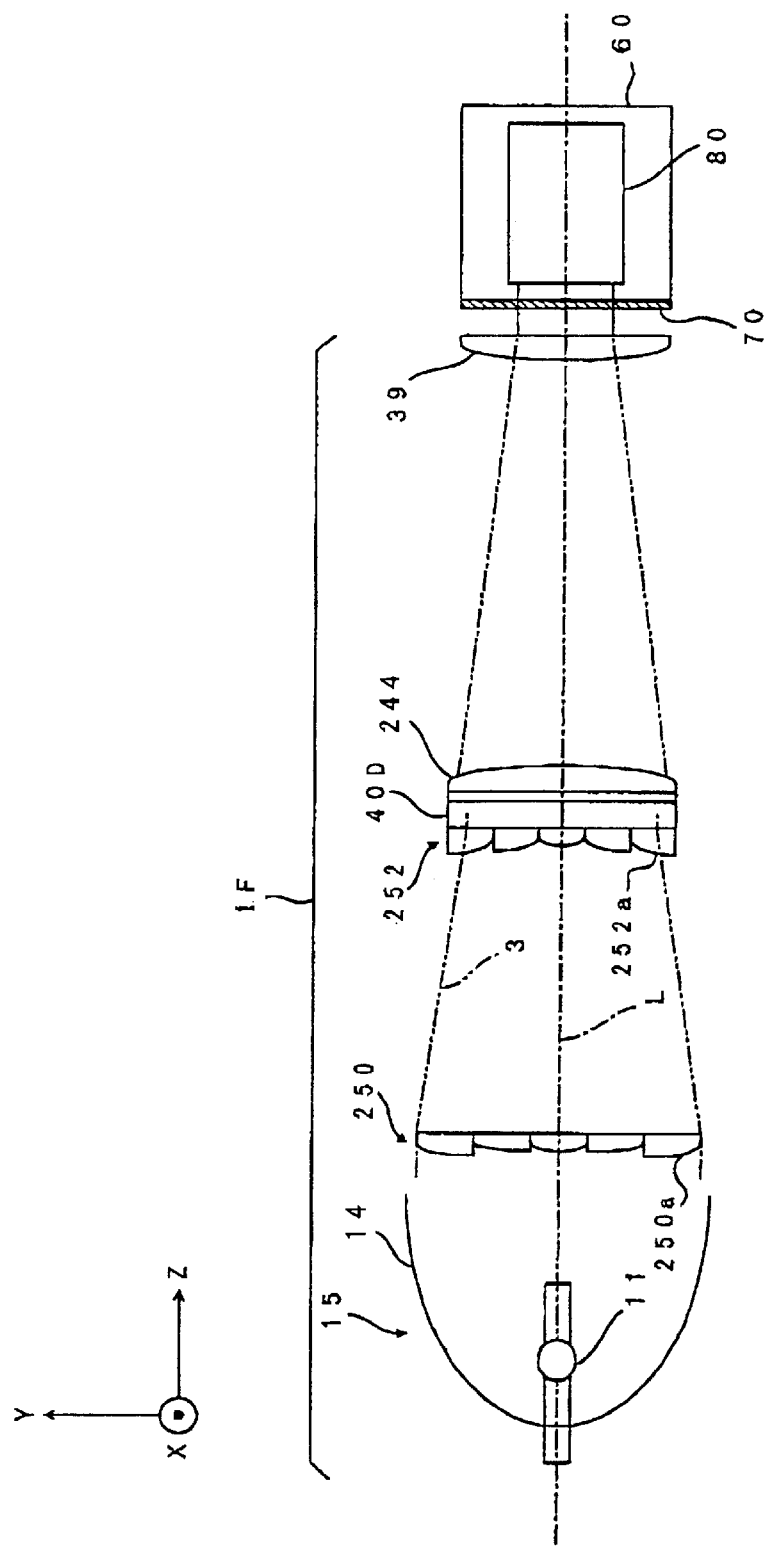
FIG. 18 is a schematic plan view illustrating the seventh embodiment of the projector of the present invention.

FIGS. 17 and 18 schematically illustrate the configuration of the seventh exemplary embodiment of the projector of the present invention. FIG. 17 is a schematic vertical sectional view illustrating the seventh embodiment in the X-Z plane. FIG. 18 is a plan view illustrating the seventh embodiment, which is taken when viewed from the direction of X-axis.

This embodiment is a modification of the fifth and sixth embodiments. That is, the lens array 250 of the illumination device 1F and the first transmitter lens 252 are arranged to have the functions of the afocal optical system 50 of the fifth and sixth embodiments. The seventh embodiment is similar to the fifth and sixth embodiments except that the cylindrical convex lens 52 and the cylindrical concave lens 54 are not provided in the seventh embodiment, and that the lens array 250 and the first transmitter lens 252 are provided therein. Further, a modification of each of the constituent elements described in the description of the fifth and sixth embodiments can be applied to the seventh embodiment. Incidentally, in these figures showing this embodiment, reference characters used in FIGS. 1 to 4 designate constituent elements similar to the corresponding ones of the first embodiment. Moreover, reference characters used in FIGS. 11 to 16 designate constituent elements similar to the corresponding ones of the fifth and sixth embodiments. Thus, the description of such constituent elements is omitted herein.

Figure 19:
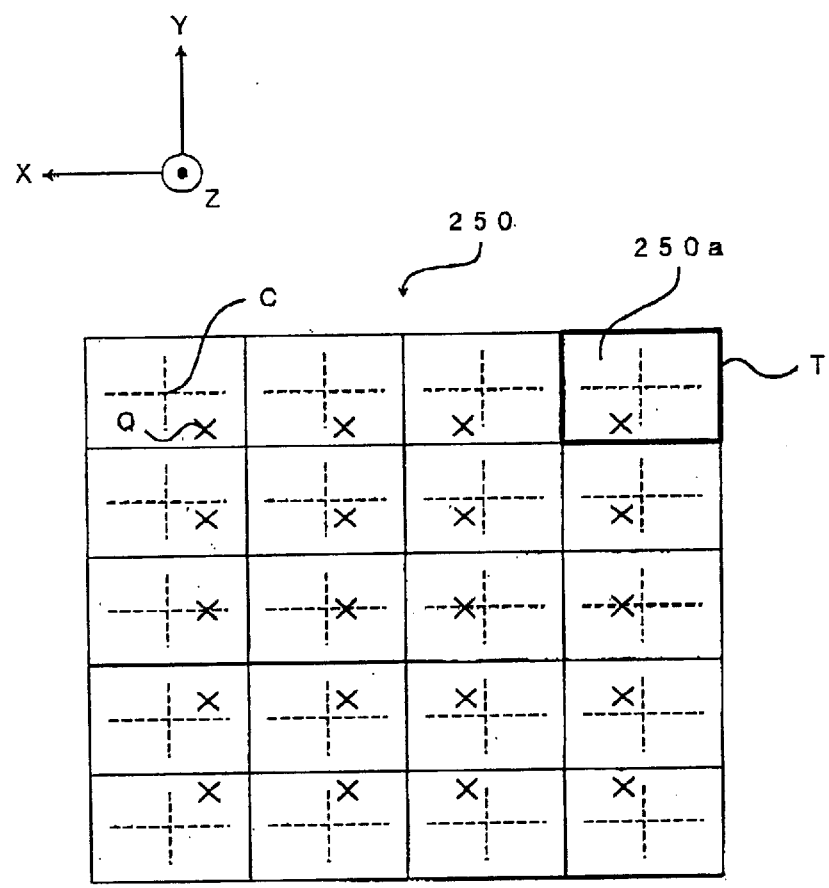
FIG. 19 is a plan view illustrating the configuration of a lens array of the seventh embodiment.

The lens array 250 is constituted by a plurality of small lenses 250a arranged in a matrix. As illustrated in FIG. 19, each of the small lenses 250a of the lens array 250 is a decentered lens whose optical axis Q is deviated from the geometrical center C thereof in the directions of X-axis and Y-axis or only in the direction of X-axis. The contour T of each of the small lenses 250a is similar to the shape of the illumination area of the liquid crystal device 80. A light beam emitted from the light source 15 is divided by the condensing action of each of the small lenses 250a of the lens array 250 into a plurality of sub light beams. Thus, a number of the light source images S that is equal to that of the small lenses 250a are formed in X-Y plane (or imaginary plane P), which is substantially perpendicular to the illumination optical axis L. Furthermore, the lens array 250 has the functions of refracting the light beams 3 to the direction of Y-axis and inwardly deflecting the light beams 3 to the direction of the illumination light beam L.

Figure 20:
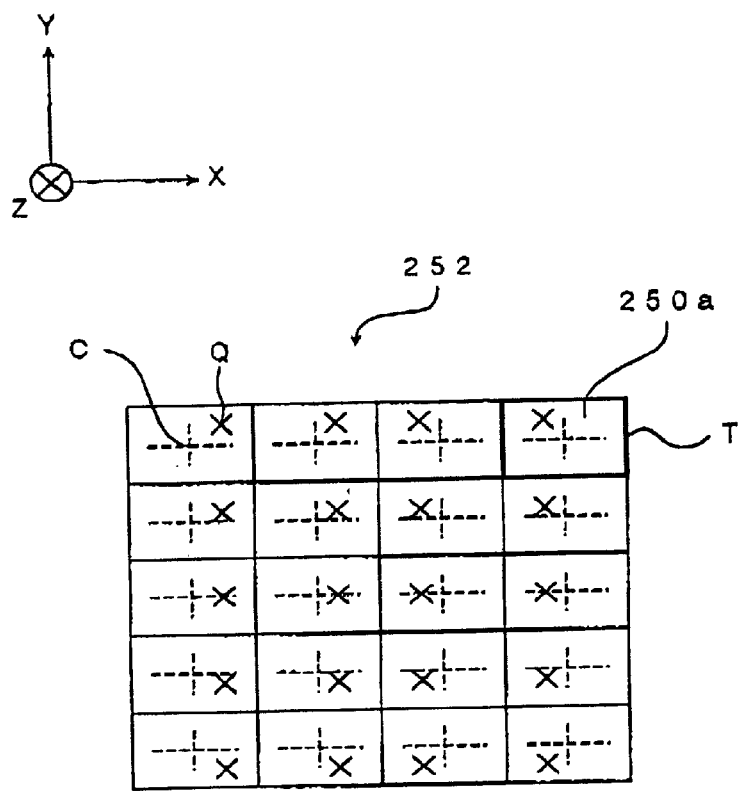
FIG. 20 is a plan view illustrating the configuration of a first transmitter lens of the seventh embodiment.

The first transmitter lens 252 is constituted by a plurality of small lenses 252a arranged in a matrix. As illustrated in FIG. 20, each of the small lenses 252a of the first transmitter lens 252 is a decentered lens whose optical axis Q is deviated from the geometrical center C thereof in the directions of X-axis and Y-axis or only in the direction of X-axis, and is configured so that the position of each of the small lenses 252a correspond to the positions at which a plurality of the light source images S are formed. Although there is no restriction on the shape of the contour of each of the small lenses 252a, it is convenient for facilitating the placement of the small lenses 252a that the shape of the contour of each of the small lenses 252a is set to be a rectangle or a hexagon. Furthermore, the small lenses 252a are decentered lenses, which are similar to the small lenses 250a. The condensing characteristics of each of the small lenses 252a are set so that the sub light beams collected by the small lenses 250a of the lens array 250 are made to be incident substantially at right angles on the incident surface 45a of the polarization conversion element 40D. Further, the lens array 252 has the function of making the light beams 3 substantially parallel to the illumination optical axis L, similarly as in the case of the cylindrical concave lens 54 (see FIGS. 11, 12, 14 to 16) of the fifth and sixth embodiments.

Figure 21:
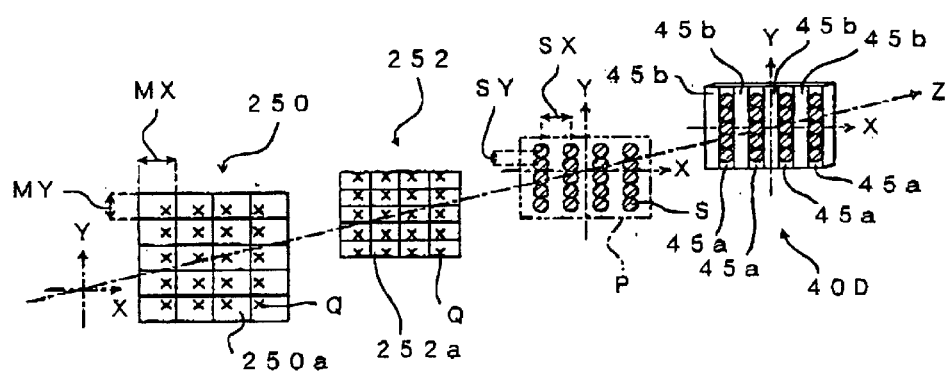
FIG. 21 is a diagram illustrating the relation between the condensing characteristics of small lenses of the lens array of the seventh embodiment and the placement intervals of the light source images.

In the seventh embodiment, as illustrated in FIG. 21, the condensing characteristics of the small lenses 250a of the lens array 250 and the small lenses 252a of the lens array 252 are set so that the following relation holds:

$$SY/SX < MY/MX,$$

similarly as in the case of the first to sixth embodiments.

The seventh embodiment can have advantages similar to those of the fifth embodiment. Moreover, functions similar to those of the afocal optical system 50 (see FIGS. 11, 12, 14 to 16) of the fifth and sixth embodiments can be implemented only by the lens array 250 and the first transmitter lens 252. Consequently, the size, weight, and cost of the projector can be achieved by reducing the number of components.

Next, the eighth embodiment of the projector of the present invention is described hereinbelow with reference to FIGS. 22 and 23.

Figure 22:
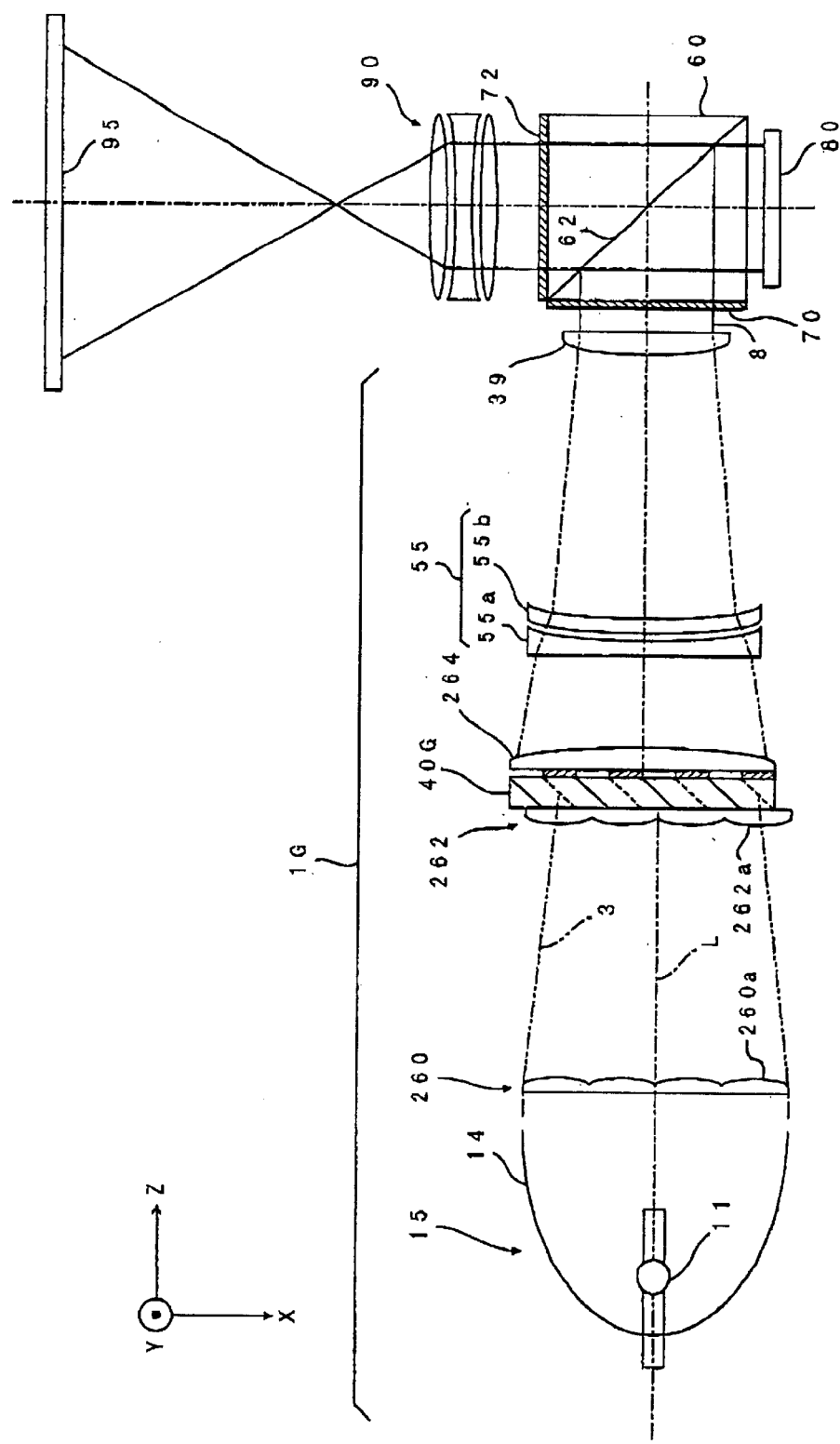
FIG. 22 is a schematic vertical sectional view illustrating an eighth exemplary embodiment of the projector of the present invention.
Figure 23:
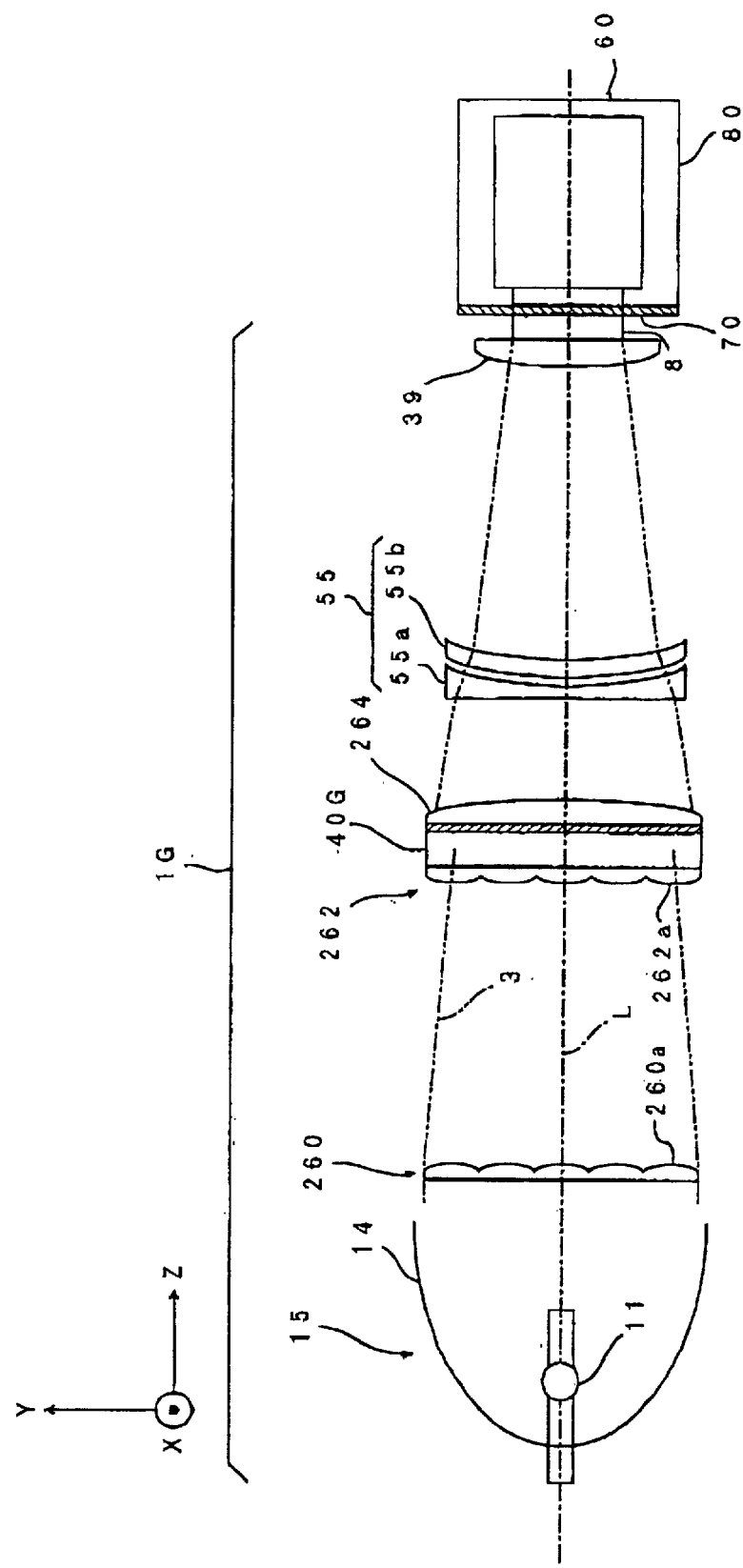
FIG. 23 is a schematic plan view illustrating the eighth embodiment of the projector of the present invention.

FIGS. 22 and 23 are diagrams schematically illustrating the configuration of the eighth exemplary embodiment of the projector of the present invention. FIG. 22 is a schematic vertical sectional view illustrating the eighth embodiment of the projector of the present invention. In FIGS. 22 and 23, constituent elements similar to the corresponding elements of the aforementioned first embodiment are designated by the same reference characters as used in FIGS. 1 to 4. Further, the description of such constituent elements is omitted herein.

The illumination device 1G has the light source 15, the lens array 260, the first transmitter lens 262, the polarization conversion element 40G, the second transmitter lens 264, and the collimating lens 39. The illumination device 1G divides light emitted from the light source 15 into a plurality of sub light beams and then converts each of the sub light beams into a single kind of polarized light beam by using the polarization conversion element 40G, and thereafter superposes the polarized light beams on the illumination area of the liquid crystal device 80.

The light source 15 is the same as that 15 of the illumination device 1B (see FIG. 17) of the third embodiment.

The lens array 260 is constituted by a plurality of small lenses 260a arranged in a matrix. The contour of each of the small lenses 260a is shaped as a rectangle. A light beam emitted from the light source 15 is divided by the condensing action of each of the small lenses 260a of the lens array 260 into a plurality of sub light beams. Thus, a number of light source images that is equal to that of the small lenses 260a are formed in the X-Y plane (or imaginary plane), which is substantially perpendicular to the illumination optical axis L. Each of the small lenses 260a of the lens array 260 is an ordinary lens whose optical axis coincides with the geometrical center line C thereof.

The first transmitter lens 262 disposed at the incidence side of the polarization conversion element 40G has a function similar to that of the first transmitter lens 35 (see FIG. 1) of the first embodiment. That is, the first transmitter lens 262 is constituted by a plurality of small lenses 262a disposed in a matrix. Each of the small lenses 262a of the first transmitter lens 262 is an ordinary lens whose optical axis coincides with the geometric center line C thereof. The position of each of the small lenses 262a correspond to the positions at which a plurality of the light source images S are formed. Although there is no restriction on the shape of the contour of each of the small lenses 262a, it is convenient for facilitating the placement of the small lenses 262a that the shape of the contour of each of the small lenses 262a is set to be a rectangle or a hexagon.

The polarization conversion element 40G differs from the conversion element 40 in that the number of the polarization separation films, the reflection films, and transmissive members disposed thereamong is larger, as compared with the case of the element 40. However, the rest of the element 40D does not differ from the corresponding part of the element 40B. Therefore, the detail description of the element 40D is omitted herein.

The second transmitter lens 264 disposed at the exit side of the polarization conversion element 40G has a function similar to that of the second transmitter lens 37 of the first embodiment, that is, the function of superposing the sub light beams divided by the lens array 260 on the illumination area of the liquid crystal device 80. The second transmitter lens 264 is constituted by a spherical lens having an axially symmetric shape. However, the lens 264 is not limited to such a spherical lens. For instance, a lens array, a Fresnel lens, or a complex lens which is a combination of a plurality of lenses, may be used as the second transmitter lens 264. In the case of using such a lens, various kinds of optical aberration can be reduced. Furthermore, in the case of using the Fresnel lens, a thickness a the center of the lens can be decreased. This is convenient for reducing the weight of the illumination device 1G.

The reduction optical system 55 disposed between the second transmitter lens 264 and the collimating lens 39 is operative to reduce the diameter of the light beams 3 emitted from the second transmitter lens 264 in the directions of the X-axis and the Y-axis. Although the reduction optical system 55 of the eighth embodiment is constituted by a complex lens which is a combination of two concave lenses 55a and 55b, the system 55 is not limited thereto. A single lens may be used as the system 55. Incidentally, the use of the complex lens or the spherical lens is suitable for reducing optical aberration that is liable to occur when the sub light beams are led to the collimating lens 39.

Incidentally, the reduction optical system 55 is configured so that the reduction ratio in the direction of Y-axis is higher than the reduction ratio in the direction of X-axis. The reason is that the polarization separation performance of the polarization separation film 62 is maintained, similarly as in the case of the first embodiment.

Thus, in this embodiment, the reduction optical system 55 having the function of reducing the diameter of the light beams 3 emitted from the second transmitter lens 264 in the directions of the X-axis and the Y-axis is provided between the second transmitter lens 264 and the collimating lens 39. Further, the incidence angle in the direction of Y-axis, which is perpendicular to the incident plane 4 (see FIG. 4), can be reduced by adapting the reduction optical system 55 to make the reduction ratio in the direction of Y-axis higher than the reduction ratio in the direction of X-axis, without having to design the illumination device so that the following relation holds:

$$SY/SX<MY/MX,$$

similarly as in the case of the first to seventh embodiment. Thus, the polarization separation performance of the polarization separation film 62 can be maintained at a relatively high level. Consequently, a bright projection image having a high contrast ratio can be realized.

Incidentally, this embodiment is adapted so that the diameter of the light beams 3 emitted from the second transmitter lens 264 is reduced in the directions of X-axis and Y-axis by using the reduction optical system 55. However, the reduction of the diameter in the direction of the X-axis is not always necessary. That is, the reduction of the diameter may be performed only in the direction of the Y-axis. In this case, it is sufficient that a lens (for example, a cylindrical lens) having curvature only in the direction of Y-axis is used as each of the concave lenses 55a and 55b of the reduction optical system 55.

Furthermore, in the eighth embodiment, the lens array 260 is used as the light beam dividing element for dividing a light beam emitted from the light source. Instead, a light beam dividing element constituted by a rod-like light guide may be used. In this case, it is sufficient that the light guide 200, which is described in the comparative example illustrated in FIG. 2(b), is used, and that the reduction optical system 55 is disposed between the position at which secondary light source images are formed and the polarization separation film 62. For example, it may be considered that the light guide 20 of FIG. 1 is replaced with the light guide 200 illustrated in FIG. 2(b), and that the reduction optical system 55 is provided between the second transmitter lens 37 and the collimating lens 39.

Figure 24:
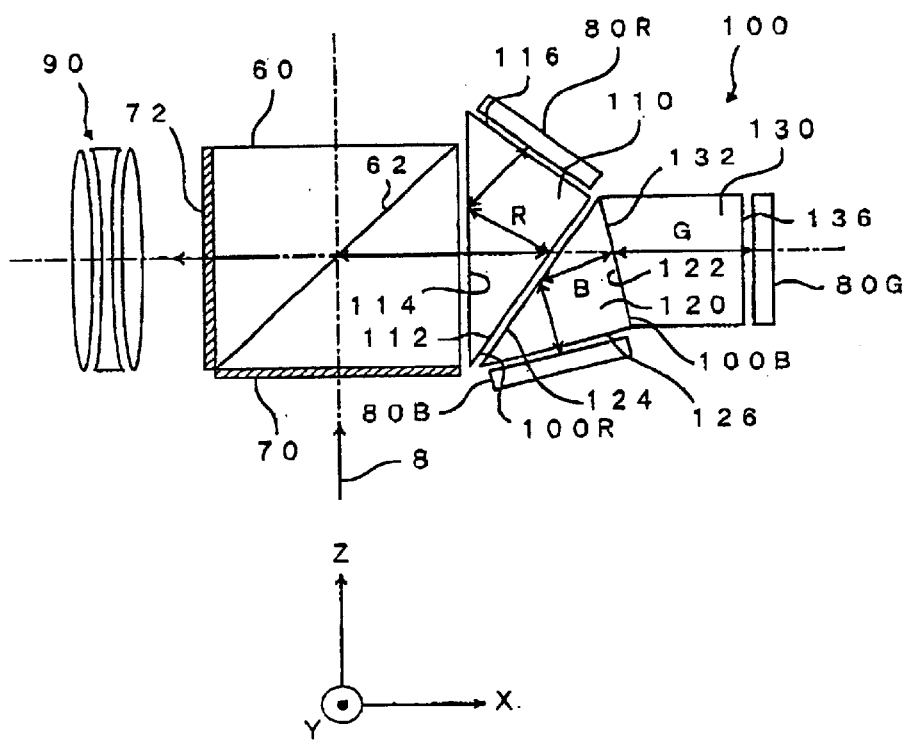
FIG. 24 is a schematic plan view illustrating a primary portion of the eighth embodiment of the projector of the present invention.

FIG. 24 is a schematic plan diagram illustrating a primary part of the second embodiment of the projector of the present invention. This embodiment is a modification of the first to eighth embodiments, and characterized in that a color image is formed by separating an illumination light beam 8 emitted from a polarization beam splitter 60 into red light beam R, blue light beam B, and green light beam G using a color separation/synthesis optical system 100, and then causing these color light beams to be respectively incident on three reflection type liquid crystal devices 80R, 80G, 80B provided correspondingly to these kinds of color light beams. The device illustrated in FIG. 24 is configured so as to be substituted for the part following the collimating lens 39 in each of the first to eighth embodiments. Incidentally, the drawings and description of the illumination devices 1 to 1G and the projection surface are omitted. Further, in FIG. 24, each of common members among this embodiment and the first to eighth embodiments is designated by the same reference characters therefor used in common in the descriptions of these embodiments. The description of such common members is omitted herein.

In FIG. 24, the color separation/synthesis optical system 100 is constituted by the combination of three prisms 110, 120, and 130. The prism 110 is a pillar-like prism having a triangular section. A red reflecting film 100R for reflecting a red light beam R and transmitting other color light beams is formed on a surface 112 of the prism 110, which is close to the prism 120 (to be described later). The prism 120 is a pillar-like prism having a triangular section. A blue reflecting dichroic film 100B for reflecting a blue light beam B and transmitting other color light beams is formed on a surface 122 of the prism 120, which is in contact with the prism 130 (to be described later). The prism 130 is a pillar-like prism having a substantially trapezoidal section, one side of which is formed as an oblique side. A surface 132 corresponding to the oblique side of the prism 130 is disposed in such a manner as to abut against a blue reflecting dichroic film 100B of the prism 120. The prism 110 is disposed so that extremely narrow gaps are provided between the prism 110 and the polarization beam splitter 60 and between the prisms 110 and 120, respectively.

The liquid crystal device 80R is a reflection type electro-optical device adapted to modulate red light beams R, and it is installed in such a way as to face a surface 116 of the prism 110 on which the red reflecting dichroic film 100R is not formed and which is not close to the polarization beam splitter 60. Further, the liquid crystal device 80B is a reflection type electro-optical device for modulating blue light beams B, and it is installed in such a way as to face a surface 126 of the prism 120 on which the blue reflecting dichroic film 120 is not formed and which is not close to the prism 110. Moreover, the liquid crystal device 80G is a reflection type electro-optical device for modulating green light beam G, and it is installed in such a way as to face a surface 136 of the prism 130 which is opposed to the surface 132 that abuts against the blue reflecting dichroic film 100B.

In this embodiment, an s-polarized light beam emitted from the illumination devices 1 to 1G and then reflected by the polarization separation film 62 is first incident on the prism 110, and then is separated into a red light beam R and other colored light beams at the red color reflecting dichroic film 100R. Then, because the gap is formed between the prism 110 and the polarization beam splitter 60, the surface 114 of the prism 110 which faces the polarization beam splitter 60 serves as a total reflection surface. Thus, the red light beam R separated by the red reflecting dichroic film 100R is totally reflected on the surface 114 and incident on the liquid crystal device 80R, whereupon the incident beams are modulated according to image information supplied from an external device (not shown). Subsequently, s-polarized light beams transmitted by the red reflecting film 100R are incident on the prism 120. Then, the blue reflecting dichroic film 100B separates blue light beams B and green light beams G from the incident light beam. Because the presence of the gap between the prisms 120 and 110, the surface 124 of the prism 120 which faces the prism 100 serves as a total reflection surface for the blue light beam B reflected by the blue reflecting dichroic film 100B. Thus, the blue light beam B reflected by the blue reflecting dichroic film 100B is totally reflected on the surface 124. The reflected blue light beam is then incident on the liquid crystal device 80B, and there the incident light beam is modulated according to the image information supplied from the external device (not shown). Finally, the green light beam transmitted by the blue reflecting dichroic film 100B linearly travels in the prism 130 and then impinges upon the liquid crystal device 80G, and there the incident green light beam is modulated according to the image information supplied from the external device (not shown).

The color light beams modulated by the liquid crystal devices 80R, 80B, and 80G then return to the color separation/synthesis optical system 100. Subsequently, light is synthesized from such light beams that follow the aforementioned optical path in a reverse. The synthesized light is incident on the polarization beam splitter 60 again. Then, the light beam modulated according to the external image information is partially p-polarized. Thus, this p-polarized light beam is transmitted by the polarization separation film 62. Subsequently, the transmitted light beams are enlarged and projected onto the projection surface 95 (see FIG. 1), such as a screen, by the projection lens 90 (see FIG. 1).

Incidentally, the projector may be configured so that the color separation/synthesis optical system 100 is disposed at a position at which the system 100 faces the illumination devices 1 to 1G. In this case, it is sufficient that the polarization states of an illumination light beam emitted from the illumination device 1 is uniformly put into the p-polarization state. Alternatively, it is sufficient that the polarization separation film of the polarization beam splitter 60 have characteristics according to which this film reflects a p-polarized light beam and transmits an s-polarized light beam. Furthermore, in this embodiment, as illustrated in FIG. 24, the dimensions of the polarization beam splitter 60 are relatively large, in comparison with the dimensions of the liquid crystal devices 80R, 80B, and 80G. Thus, preferably, a condensing lens for reducing the diameter of the light beam is disposed at the light-source side of the polarization beam splitter 60.

The projector of this embodiment offers advantages similar to those of the first embodiment.

The mode for carrying out the present invention is not limited to the aforementioned embodiments. Various modifications may be made within the scope of the invention. For example, the aforementioned embodiments each use the polarization conversion optical system for converting sub light beams into a single kind of polarized light. However, such a polarization conversion optical system can be omitted. Incidentally, it can be said from the viewpoint of enhancement of the light utilization efficiency that the embodiment using the polarization conversion optical system is superior to an embodiment that does not use the polarization conversion optical system. Furthermore, the projector may be either the rear projection type which projects an image on a screen from the rear thereof, or the front projection type that projects an image on the screen from the front thereof.

What is claimed is:

1. A projector, comprising:
an illumination device including a light beam dividing optical element, that divides a light beam into a plurality of sub light beams, and that forms a plurality of light source images from said plurality of the sub light beams;
an electro-optical device that modulates an illumination light beam emitted by said illumination device;
a projection lens that projects the light beam modulated by said electro-optical device; and
a polarization separation film that selects a light beam of a predetermined polarization component included in said illumination light beam to emit the selected light beam of the predetermined polarization component to said electro-optical device, and that selects a light beam of a predetermined polarization component from the light beam modulated by said electro-optical device to emit the selected light beam to said projection lens,
said light beam dividing optical element being a rod-like light guide having an incidence end surface, an exit end surface, and at least four reflective surfaces, and satisfying:

$$SY/SX < MY/MX,$$

where:
MX is a length of said incidence end surface in the X-direction,
MY is a length of said incidence end surface in the Y-direction,
SX is a placement interval of said plurality of the light source images in the X-direction, and
SY is a placement interval of said plurality of the light source images in the Y-direction,
when:
an incident plane is a plane defined by a center axis of said illumination light beam and a normal to said polarization separation film,
a direction parallel to said incident plane and perpendicular to an illumination optical axis is an X-direction, and
a direction perpendicular to said incident plane is a Y-direction.

2. The projector according to claim 1, further comprising a color separation optical system that separates an illumination light beam emitted by said illumination device into a plurality of color light beams, and said electro-optical device comprising a plurality of electro-optical devices that modulate the color light beams separated by said color separation optical system.

3. The projector according to claim 1, a distance between a pair of said reflective surfaces opposed to each other in the Y-direction of said light guide gradually increasing toward said exit end surface from said incidence end surface.

4. The projector according to claim 1, a distance between a pair of said reflective surfaces opposed to each other in the X-direction of said light guide gradually decreasing toward said exit end surface from said incidence end surface.

5. The projector according to claim 1, a shape of said exit end surface of said light guide being similar to a shape of a display area of said electro-optical device.

6. A projector, comprising:
an illumination device including a light beam dividing optical element, that divides a bundle of light beams into a plurality of sub light beams and that forms a plurality of light source images from said plurality of sub light beams;
an electro-optical device that modulates an illumination light beam emitted by said illumination device;
a projection lens that projects the light beam modulated by said electro-optical device; and
a polarization separation film that selects a light beam of a predetermined polarization component included in the illumination light beam to emit the selected light beam of the predetermined polarization component to said electro-optical device, and that selects a light beam of a predetermined polarization component from the light beam modulated by said electro-optical device to emit the selected light beam to said projection lens,
said light beam dividing optical element being a lens array having a plurality of small lenses, and satisfying:

$$SY/SX < MY/MX,$$

where:
MX is a length of a contour of a small lens in the X-direction,
MY is a length of a contour of a small lens in the Y-direction,
SX is a placement interval of said plurality of the light source images in the X-direction, and
SY is a placement interval of said plurality of the light source images in the Y-direction,
when:
an incident plane is a plane defined by a center axis of said illumination light beam and a normal to said polarization separation film,
a direction parallel to said incident plane and perpendicular to an illumination optical axis is an X-direction, and
a direction perpendicular to said incident plane is a Y-direction.

7. The projector according to claim 6, further comprising a color separation optical system that separates an illumination light beam emitted by said illumination device into a plurality of color light beams, and said electro-optical device comprising a plurality of electro-optical devices that modulate the color light beams separated by said color separation optical system.

8. The projector according to claim 6, the contour of said plurality of small lenses being substantially similar to a shape of a display area of said electro-optical device.

9. The projector according to claim 6, at least a part of said plurality of small lenses being decentered lenses.

10. The projector according to claim 6, said illumination device having a reduction optical system that reduces a diameter of said illumination light beam.

11. The projector according to claim 10, said reduction optical system decreasing placement intervals of said light source images in the Y-direction.

12. The projector according to claim 11, said reduction optical system furthermore decreasing placement intervals of said light source images in the X-direction.

13. A projector, comprising:
an illumination device that divides a light beam into a plurality of sub light beams and that forms a plurality of light source images from the plurality of sub light beams;

an electro-optical device that modulates an illumination light beam emitted by said illumination device;

a projection lens that projects light beams modulated by said electro-optical device; and a polarization separation film that selects a light beam of a predetermined polarization component included in said illumination light beam to emit the selected light beam of the predetermined polarization component to said electro-optical device, and that selects a light beam of a predetermined polarization component from the light beam modulated by said electro-optical device to emit the selected light beam to said projection lens, said illumination device comprising a reduction optical system that reduces a diameter of said illumination light beam, a rate of reduction in diameter of a light beam in a Y-direction by said reduction optical system is larger than a rate of reduction in the diameter of the light beam in an X-direction; and when an incident plane is a plane defined by a center axis of said illumination light beam and a normal to said polarization separation film, a direction parallel to said incident plane and perpendicular to a illumination optical axis is the X-direction and a direction perpendicular to said incident plane is the Y-direction.

14. The projector according to claim 13, further comprising a color separation optical system that separates an illumination light beam emitted by said illumination device into a plurality of color light beams, and the electro-optical device comprising a plurality of said electro-optical devices that modulate the color light beams separated by said color separation optical system.

* * * * *